(12) United States Patent
Rhee et al.

(10) Patent No.: US 10,108,143 B2
(45) Date of Patent: Oct. 23, 2018

(54) MOBILE TERMINAL AND METHOD FOR CONTROLLING THE SAME

(71) Applicant: LG ELECTRONICS INC., Seoul (KR)

(72) Inventors: Eunjoo Rhee, Seoul (KR); Soungmin Im, Seoul (KR)

(73) Assignee: LG Electronics Inc., Seoul (KR)

( * ) Notice: Subject to any disclaimer, the term of this patent is extended or adjusted under 35 U.S.C. 154(b) by 301 days.

(21) Appl. No.: 15/017,227

(22) Filed: Feb. 5, 2016

(65) Prior Publication Data

US 2017/0068213 A1    Mar. 9, 2017

(30) Foreign Application Priority Data

Sep. 7, 2015  (KR) .......................... 10-2015-0126506

(51) Int. Cl.
*H04N 5/89* (2006.01)
*G03H 1/00* (2006.01)
(Continued)

(52) U.S. Cl.
CPC ......... *G03H 1/0005* (2013.01); *G03H 1/2294* (2013.01); *G06F 3/011* (2013.01);
(Continued)

(58) Field of Classification Search
CPC ............... G03H 1/0005; G03H 1/2294; G03H 2001/0061; G03H 2226/05;
(Continued)

(56) References Cited

U.S. PATENT DOCUMENTS

2014/0071506 A1   3/2014  Han et al.
2014/0282008 A1*  9/2014  Verard ................... G03H 1/00
                                                    715/728

(Continued)

FOREIGN PATENT DOCUMENTS

EP           2472357           7/2012

OTHER PUBLICATIONS

Extended European Search Report issued in European Application No. 16154933.2 dated Aug. 26, 2016, 9 pages.

*Primary Examiner* — Sathyanaraya V Perungavoor
*Assistant Examiner* — Peet Dhillon
(74) *Attorney, Agent, or Firm* — Fish & Richardson P.C.

(57) ABSTRACT

Disclosed are a mobile terminal having a hologram output unit and a method for controlling the same. The mobile terminal, comprises: a hologram output unit configured to output a hologram object to an output space outside the mobile terminal; an image sensor configured to sense a portion of a human body located within the output space of the hologram object; a feedback output unit configured to output a feedback signal; and a controller configured to: determine a relative position between the hologram object output by the hologram output unit and the portion of the human body sensed by the image sensor; detect, based on the relative position between the hologram object and the portion of the human body, that the portion of the human body approaches the hologram object, and control, based on the detection that the portion of the human body approaches the hologram object, the feedback output unit to transmit the feedback signal towards the portion of the human body that is detected to approach the hologram object.

20 Claims, 26 Drawing Sheets

(51) Int. Cl.
*G06F 3/01* (2006.01)
*G06F 3/0481* (2013.01)
*G06F 3/0484* (2013.01)
*G03H 1/22* (2006.01)
*G06K 9/00* (2006.01)

(52) U.S. Cl.
CPC .......... *G06F 3/017* (2013.01); *G06F 3/04815* (2013.01); *G06F 3/04842* (2013.01); *G06K 9/00375* (2013.01); *G03H 2001/0061* (2013.01); *G03H 2226/05* (2013.01); *G03H 2227/02* (2013.01)

(58) Field of Classification Search
CPC ..... G03H 2227/02; G06F 3/011; G06F 3/017; G06F 3/04815; G06F 3/04842; G06K 9/00375
See application file for complete search history.

(56) References Cited

U.S. PATENT DOCUMENTS

| | | |
|---|---|---|
| 2015/0227203 A1 | 8/2015 | Chen et al. |
| 2015/0244747 A1* | 8/2015 | Wickenkannp; Vanessa ............... H04L 65/403 726/28 |
| 2016/0299565 A1* | 10/2016 | Sudarsky ................ G06F 3/013 |

* cited by examiner (a)　　　　(b)　　　　(c)　　　　(d)

(a)          (b)          (c)

(a)  (b)

(c)  (d)

(a)　　　　　　　　　　　　(b)

(a)　　　　　　　　　　　　(b)

(c)　　　　　　　　　　　　(d)

MOBILE TERMINAL AND METHOD FOR CONTROLLING THE SAME

CROSS-REFERENCE TO RELATED APPLICATION

Pursuant to 35 U.S.C. § 119(a), this application claims the benefit of earlier filing date and right of priority to Korean Application No. 10-2015-0126506, filed on Sep. 7, 2015, the contents of which is incorporated by reference herein in its entirety.

BACKGROUND OF THE INVENTION

1. Field of the Invention

The present invention relates to a mobile terminal, and more particularly, to a mobile terminal having a hologram output unit and a method for controlling the same.

2. Background of the Invention

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

Efforts are ongoing to support and increase the functionality of mobile terminals. Such efforts include software and hardware improvements, as well as changes and improvements in the structural components.

As one of such structural changes and improvements, a mobile terminal having a hologram output unit, and an interaction between a hologram object output through the hologram output unit and a user may be considered.

SUMMARY OF THE INVENTION

Therefore, an aspect of the detailed description is to provide a mobile terminal capable of providing a user interaction with respect to a hologram object.

Another aspect of the detailed description is to provide a mobile terminal capable of providing a realistic user interaction according to a characteristic of an object corresponding to a hologram object.

Another aspect of the detailed description is to provide a method for more effectively sensing a user's approach, according to a characteristic of an object corresponding to a hologram object.

To achieve these and other advantages and in accordance with the purpose of this specification, as embodied and broadly described herein, there is provided a mobile terminal, including: a hologram output unit configured to output a hologram object to a preset space; an image sensor configured to sense a human body located at the output space of the hologram object; an output unit configured to output a feedback signal; and a controller configured to detect approach of the human body to the hologram object, based on a relative position between the hologram object and the human body, and configured to control the output unit such that the feedback signal is transmitted to the human body which has approached the hologram object, based on a result of the detection.

In an embodiment, the output unit may include at least one of a laser output module and a sound wave output module. And the feedback signal may include at least one of laser output from the laser output module, and a sound wave output from the sound wave output module.

In an embodiment, the feedback signal may be one of a plurality of different feedback signals. And the plurality of feedback signals may be different from each other in at least one of an intensity, an amplitude, a frequency and a waveform of the laser or the sound wave.

In an embodiment, when the human body's approach to the hologram object is detected in a deactivated state of the output unit, the controller may convert the deactivated state of the output unit into an activated state such that the feedback signal is output.

In an embodiment, the output space of the hologram object may include a first region where the hologram object is positioned, and a second region adjacent to the first region. When the human body is positioned on one of the first region and the second region, the controller may control the output unit such that the feedback signal is output.

In an embodiment, the controller may control the output unit to output a different feedback signal, according to whether the human body is positioned on the first region or the second region.

In an embodiment, the controller may determines a relative position between the hologram object and the human body, by comparing coordinates information of the first region where the hologram object is positioned, and the second region adjacent to the first region in the preset space, with coordinates information of the human body. And the controller may determine one of the first and second regions where the human body is positioned, based on a result of the determination.

In an embodiment, the coordinates information of the first region where the hologram object is positioned, and the second region adjacent to the first region in the preset space, and the coordinates information of the human body may be acquired through a specific type of modeling with respect to each of the hologram object and the human body.

In an embodiment, the controller may execute the specific type of modeling, with respect to an image object corresponding to the human body, from an image acquired by the image sensor.

In an embodiment, the specific type of modeling with respect to the hologram object may be executed by a method determined based on a characteristic of an object corresponding to the hologram object, among a plurality of modeling methods.

In an embodiment, the controller may control the output unit such that a different feedback signal is transmitted according to a characteristic of an object corresponding to the hologram object. The characteristic of the object may include at least one of a type, a weight, a size, an intensity, a shape and a surface of the object.

In an embodiment, the controller may output a different feedback signal according to the characteristic of the object, by controlling at least one of an intensity, an amplitude, a frequency and a waveform of the feedback signal.

In an embodiment, when the human body is positioned at a peripheral region of the hologram object, the controller may output notification information indicating that the feedback signal is outputtable.

In an embodiment, the notification information may include video information. And the controller may control the hologram output unit to output the notification information, to a region among the peripheral region of the hologram object, the region corresponding to a position of the human body and where the feedback signal is transmittable.

In an embodiment, the controller may output a first feedback signal when the human body approaches the hologram object at a first speed. And the controller may output a second feedback signal different from the first feedback signal when the human body approaches the hologram object at a second speed different from the first speed.

In an embodiment, the image sensor may be configured to sense a gesture of the human body approaching the hologram object. And the controller may control the hologram output unit such that at least one of an output position and a shape of the hologram object is changed, in response to the sensed gesture of the human body.

In an embodiment, the controller may move the hologram object in the preset output space, in response to a gesture of the human body. When the hologram object is positioned at a boundary region of the preset space, the controller may change a shape of the hologram object in response to a gesture of the human body.

To achieve these and other advantages and in accordance with the purpose of this specification, as embodied and broadly described herein, there is also provided a method for controlling a mobile terminal, including: outputting a hologram object to a preset space; sensing a human body located at the preset output space of the hologram object; detecting approach of the human body to the hologram object, based on a relative position between the hologram object and the human body; and controlling a haptic module such that a feedback signal is transmitted to the human body approaching the hologram object, based on a result of the detection.

The output space of the hologram object may include a first region where the hologram object is positioned, and a second region adjacent to the first region. In the controlling a haptic module, a different feedback signal may be output according to whether the human body is positioned on the first region or the second region.

The feedback signal may include at least one of laser and a sound wave. In the controlling a haptic module, one of a plurality of feedback signals different from each other in at least one of an intensity, an amplitude, a frequency and a waveform may be output, the one determined based on a characteristic of an object corresponding to the hologram object.

To achieve these and other advantages and in accordance with the purpose of this specification, as embodied and broadly described herein, there is also provided a mobile terminal, comprising: a hologram output unit configured to output a hologram object to an output space outside the mobile terminal; an image sensor configured to sense a portion of a human body located within the output space of the hologram object; a feedback output unit configured to output a feedback signal; and a controller configured to: determine a relative position between the hologram object output by the hologram output unit and the portion of the human body sensed by the image sensor; detect, based on the relative position between the hologram object and the portion of the human body, that the portion of the human body approaches the hologram object, and control, based on the detection that the portion of the human body approaches the hologram object, the feedback output unit to transmit the feedback signal towards the portion of the human body that is detected to approach the hologram object.

In an embodiment, the feedback output unit comprises at least one of a laser output module or a sound wave output module, and wherein the feedback signal comprises at least one of a laser output from the laser output module or a sound wave output from the sound wave output module.

In an embodiment, the feedback signal is one of a plurality of different feedback signals, and wherein the plurality of feedback signals are different from each other in at least one of an intensity, an amplitude, a frequency, or a waveform of the laser or the sound wave.

In an embodiment, the controller is configured to: determine that the detection of the portion of the human body approaching the hologram object occurs in a deactivated state of the feedback output unit; and convert the deactivated state of the feedback output unit into an activated state to output the feedback signal from the feedback output unit.

In an embodiment, wherein the output space of the hologram object comprises a first region where the hologram object is positioned and a second region adjacent to the first region, and wherein the controller is configured to: determine whether the portion of the human body is positioned in the first region or the second region; and control the feedback output unit to output the feedback signal according to the determination of whether the portion of the human body is positioned in the first region or the second region.

In an embodiment, the controller is configured to control the feedback output unit to output a first feedback signal or a second feedback signal according to whether the portion of the human body is positioned in the first region or the second region, respectively.

In an embodiment, the controller is configured to: compare coordinate information of the portion of the human body with coordinate information of the first region where the hologram object is positioned and coordinate information of the second region adjacent to the first region; determine a relative position between the hologram object and the portion of the human body based on the comparison of coordinate information of the portion of the human body with coordinate information of the first region where the hologram object is positioned and coordinate information of the second region adjacent to the first region; and determine that the portion of the human body is located in one of the first region or the second region based on the determination of the relative position between the hologram object and the portion of the human body.

In an embodiment, wherein the controller is configured to: determine a model of the hologram object and a model of the portion of the human body; and determine, based on the model of the hologram object and the model of the portion of the human body, the coordinate information of the first region where the hologram object is positioned, the coordinate information of the second region adjacent to the first region, and the coordinate information of the portion of the human body.

In an embodiment, the controller is configured to determine the model of the portion of the human body by: determining an image of the portion of the human body acquired by the image sensor; determining an image object corresponding to the portion of the human body from the image acquired by the image sensor; and determining the model of the portion of the human body based on the image object corresponding to the portion of the human body that was determined from the image acquired by the image sensor.

In an embodiment, the controller is configured to determine the model of the hologram object by: determining a characteristic of an object corresponding to the hologram object; selecting, from among a plurality of modeling methods, a modeling method based on the determined characteristic of the object corresponding to the hologram object; and determining the model of the hologram object based on executing the modeling method selected from among the plurality of modeling methods.

In an embodiment, the controller is configured to control the feedback output unit by: determining a characteristic of an object corresponding to the hologram object; and controlling the feedback output unit to transmit the feedback signal according to the determined characteristic of the object corresponding to the hologram object, wherein determining the characteristic of the object corresponding to the hologram object comprises determining at least one of a type, a weight, a size, an intensity, a shape, or a surface of the object corresponding to the hologram object.

In an embodiment, the controller is configured to control the feedback output unit to transmit the feedback signal according to the determined characteristic of the object corresponding to the hologram object by: controlling at least one of an intensity, an amplitude, a frequency, or a waveform of the feedback signal.

In an embodiment, the controller is configured to: determine that the portion of the human body is positioned in a peripheral region that is within a predetermined distance of the hologram object; and output, based on the determination that the portion of the human body is positioned in the peripheral region of the hologram object, notification information indicating that the feedback signal is capable of being output.

In an embodiment, the notification information comprises video information, and wherein the controller is configured to output the notification information indicating that the feedback signal is capable of being output by: determining a region, within the peripheral region of the hologram object, that corresponds to a position of the portion of the human body and where the feedback signal is capable of being transmitted; and controlling the hologram output unit to output the notification information to the determined region within the peripheral region of the hologram object that corresponds to the position of the portion of the human body and where the feedback signal is capable of being transmitted.

In an embodiment, the controller is configured to control the feedback output unit to transmit the feedback signal towards the portion of the human body by: determining a speed at which the portion of the human body approaches the hologram object; outputting a first feedback signal based on a determination that the portion of the human body approaches the hologram object at a first speed, and outputting a second feedback signal different from the first feedback signal based on a determination that the portion the human body approaches the hologram object at a second speed different from the first speed.

In an embodiment, the image sensor is configured to sense a gesture of the portion of the human body that approaches the hologram object, and wherein the controller is configured to control the hologram output unit to change at least one of an output position or a shape of the hologram object, in response to the sensed gesture of the portion of the human body.

In an embodiment, the controller is configured to control the hologram output unit to change the output position of the hologram object within the output space in response to a gesture of the human body, and wherein the controller is further configured to: determine whether the hologram object is positioned at a boundary region of the output space; and control the hologram output unit, based on a determination that the hologram object is positioned at the boundary region of the output space, to change the shape of the hologram object in response to a gesture of the human body.

To achieve these and other advantages and in accordance with the purpose of this specification, as embodied and broadly described herein, there is also provided a method for controlling a mobile terminal, including: outputting a hologram object to an output space outside the mobile terminal; sensing a portion of a human body located within the output space of the hologram object; determining a relative position between the hologram object and the portion of the human body; detecting, based on the relative position between the hologram object and the portion of the human body, that the portion of the human body approaches the hologram object; and controlling, based on the detection that the portion of the human body approaches the hologram object, a haptic module such that a feedback signal is transmitted towards the portion of the human body that approaches the hologram object.

In an embodiment, the output space of the hologram object comprises a first region where the hologram object is positioned and a second region adjacent to the first region, and wherein the controller is configured to: determine whether the portion of the human body is positioned in the first region or the second region; and control the haptic module to output the feedback signal according to determination of whether the human body is positioned in the first region or the second region.

In an embodiment, the feedback signal comprises at least one of a laser or a sound wave, and wherein the controller is configured to: determine a characteristic of an object corresponding to the hologram object; and control the haptic module to output at least one of an intensity, an amplitude, a frequency, or a waveform of the feedback signal based on the determined characteristic of the object corresponding to the hologram object.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Figure 1A:
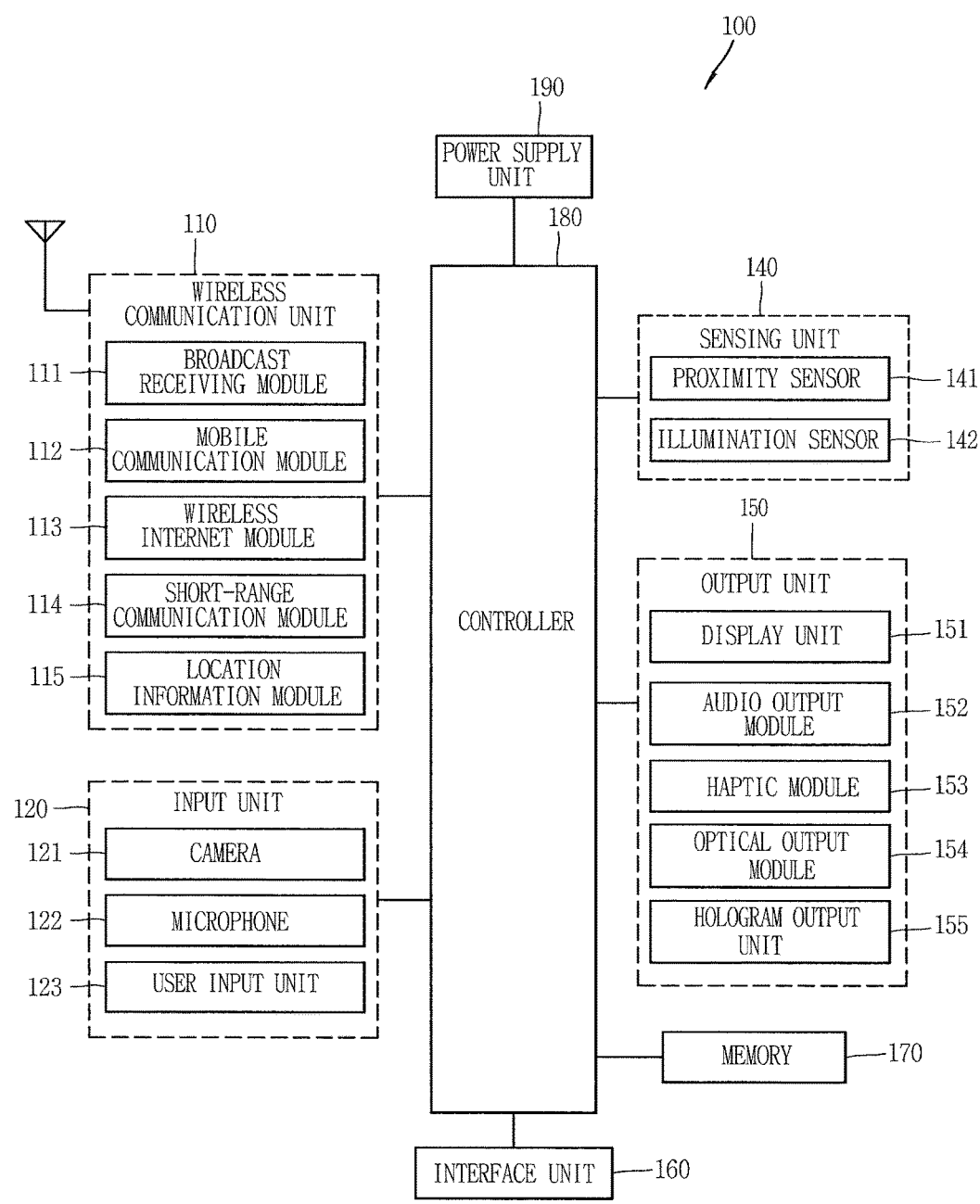
FIG. 1A is a block diagram of a mobile terminal according to the present invention.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1B:
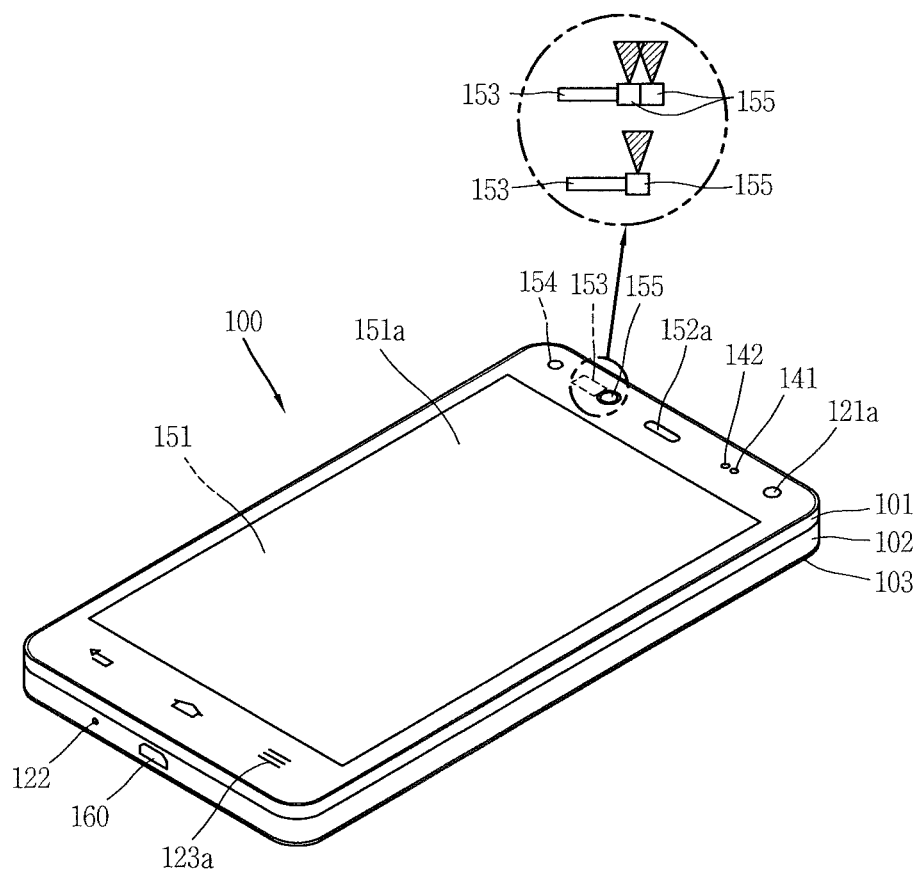
FIGS. 1B and 1C are conceptual views of a mobile terminal according to an embodiment of the present invention, which are viewed from different directions.
Figure 1C:
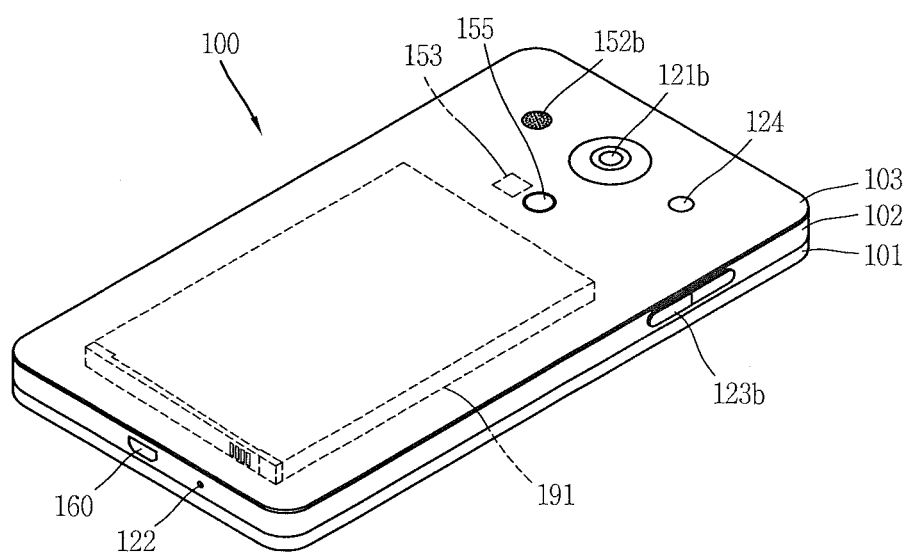

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

In the mobile terminal according to the present invention, the camera 121 may include a three-dimensional (3D) camera or a depth camera. In the present invention, a user's body positioned in an arbitrary space (preset space) where a holographic image (hologram object) is output, is sensed by an image sensor provided at a 3D camera (depth camera). The image sensor may be configured to sense a user's body or sense a user's gesture in the arbitrary space. In the mobile terminal according to the present invention, a 3D image corresponding to an object (user's body) approaching a holographic image, may be acquired by such a 3D camera.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150, configured to generate an output in a visible, audible or tactile manner, may include at least one of a display unit 151, an audio output unit 152, a haptic module 153, an optical output unit 154, and a hologram output unit (a holography module) 155. The display unit 151 may have a layered structure with a touch sensor, or may be integrally formed with a touch sensor, thereby implementing a touch screen. The touch screen may serve as the user input unit 123 for providing an input interface between the mobile terminal 100 and a user, or may provide an output interface between the mobile terminal 100 and a user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The memory 170 may store therein information on hologram interference patterns so as to support projection of a holographic image by the hologram output unit 155. The controller 180 may output information which can be visually output from the mobile terminal, through the hologram output unit 155 in the form of a holographic image, based on the information stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The hologram output unit (holography module 155) is configured to output a holographic image to a preset space. A structure of the holography module 155, and a method for projecting a holographic image using the structure will be explained in more detail with reference to FIGS. 2A to 5B.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The hologram output unit 155 may be provided at the terminal body. The hologram output unit 155 may be configured to output a holographic image 155' (refer to FIG. 2A) to a front surface of the terminal body, e.g., a space above the display unit 151. In the present invention, the hologram output unit 155 is provided at one region of the display unit 151. In the present invention, the hologram output unit 155 may be disposed on any region of the terminal body, and the position of the hologram output unit 155 may be variously changed according to a design.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The hologram output unit 155 may be provided on a rear surface of the terminal body, and may be configured to output the holographic image 155' (refer to FIG. 2B) to a space above the rear surface of the terminal body. In the present invention, the hologram output unit 155 may be provided on at least one of a front surface, a side surface and a rear surface of the terminal body.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Hereinafter, a principle to output a holographic image through the hologram output unit 155, and a method thereof will be explained in more detail with reference to the attached drawings.

Figure 2A:
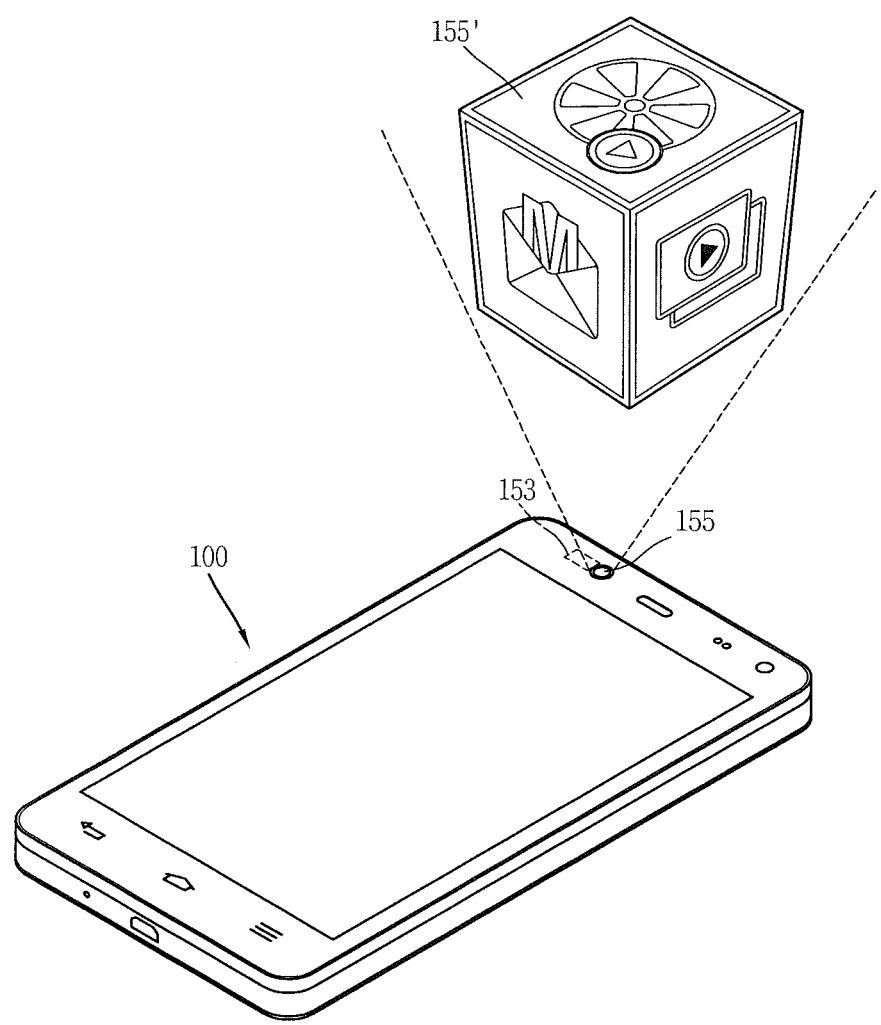
FIGS. 2A and 2B are conceptual views illustrating that a holographic image is implemented through a hologram output unit.
Figure 2B:
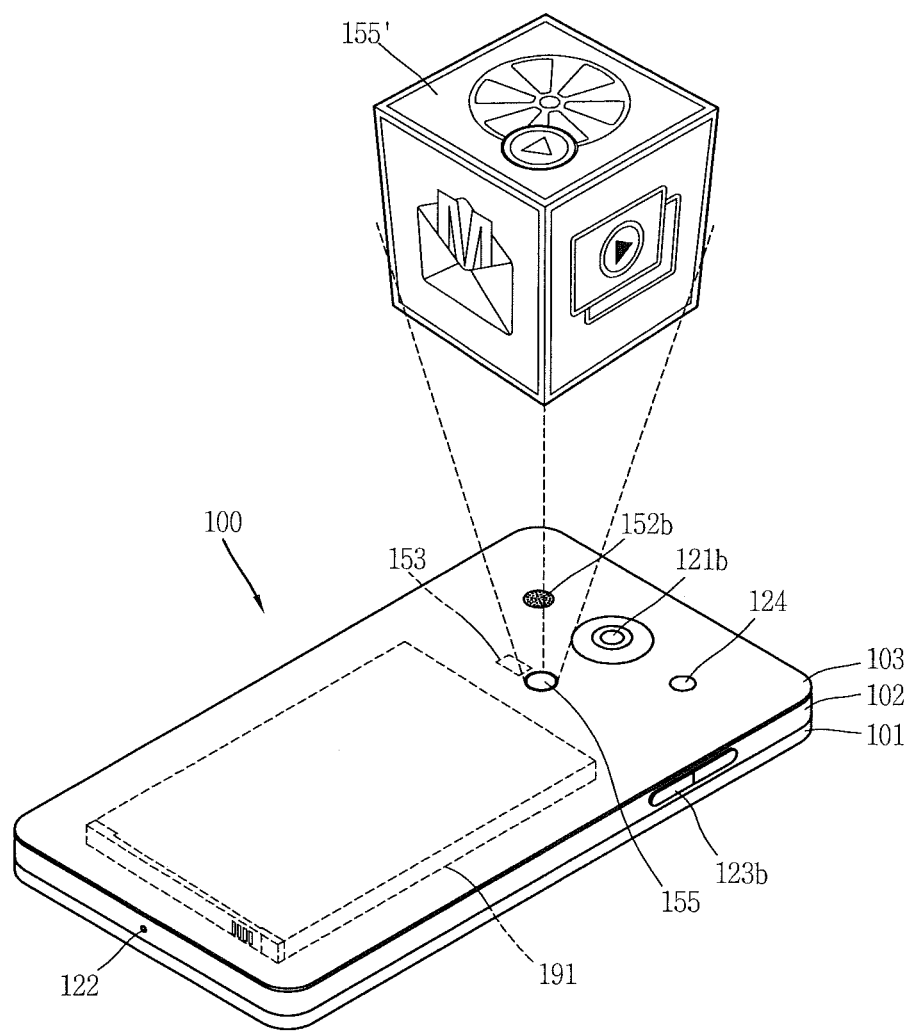
Figure 3A:
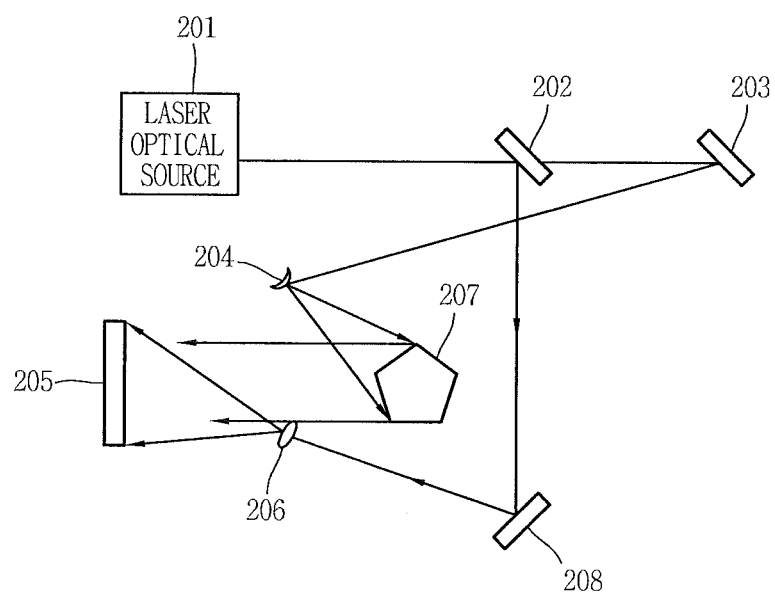
FIGS. 3A and 3B are conceptual views illustrating a hologram principle.
Figure 3B:
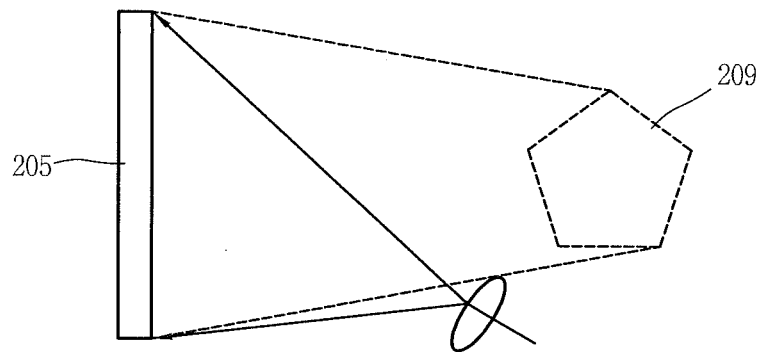
Figure 4A:
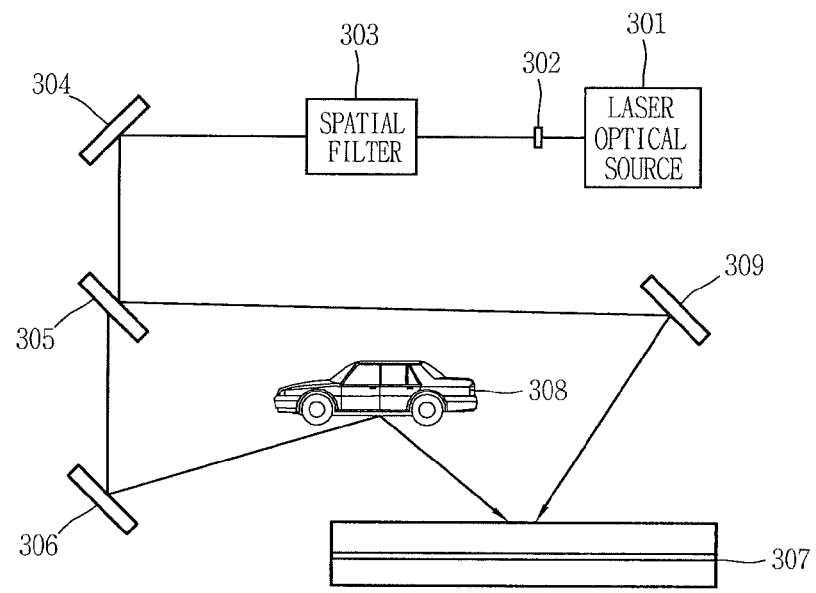
FIGS. 4A to 4C are conceptual views illustrating a transmission-type holography method.
Figure 4B:
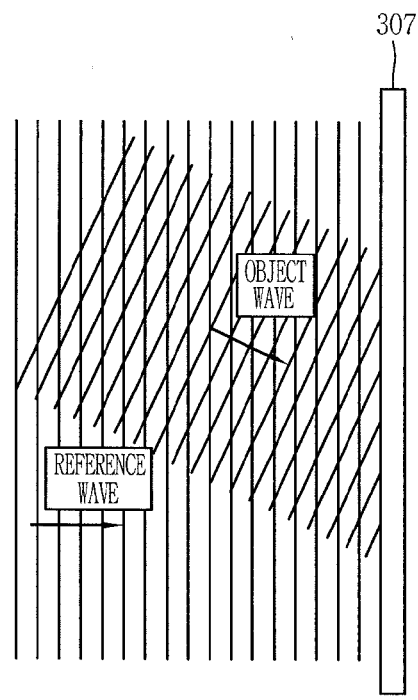
Figure 4C:
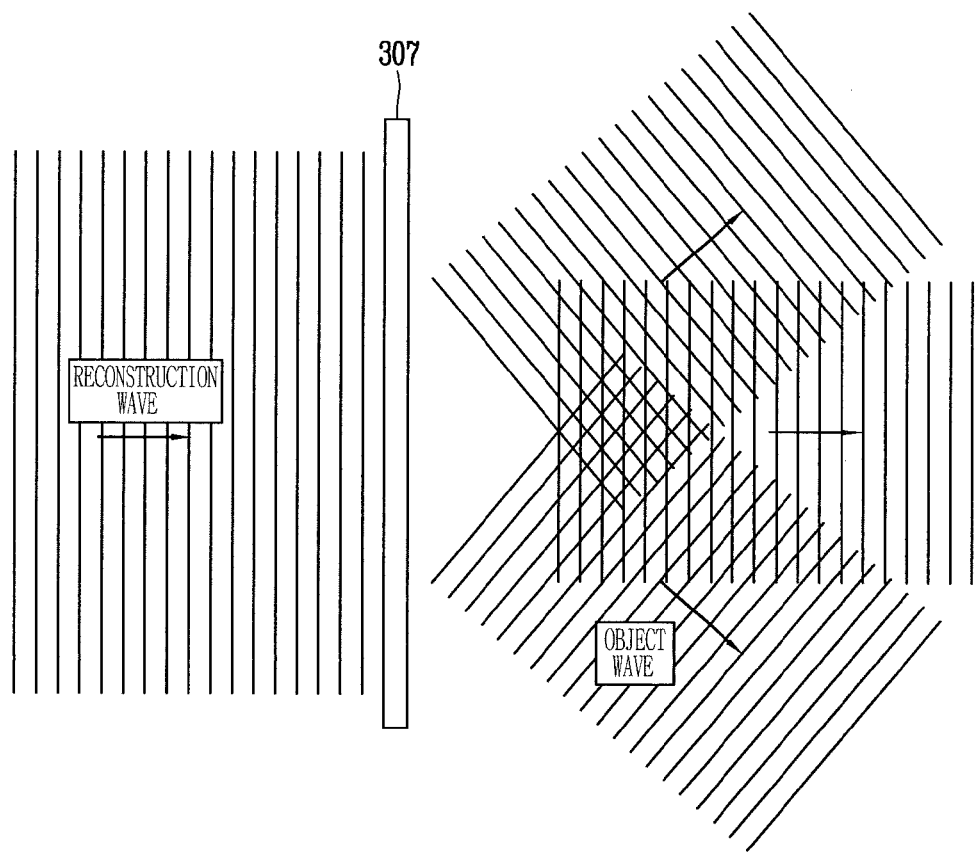
Figure 5A:
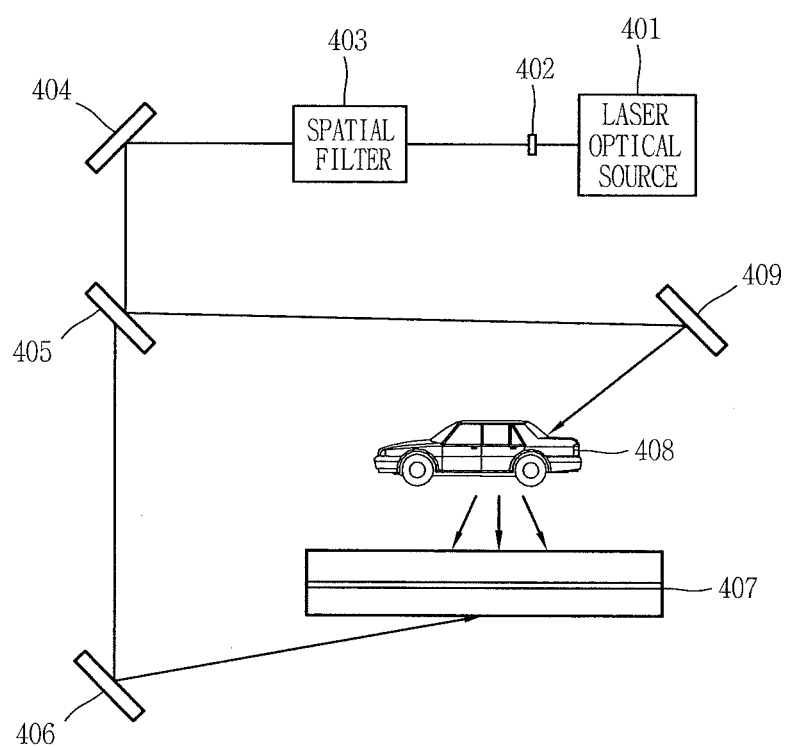
FIGS. 5A to 5C are conceptual views illustrating a reflection-type holography method.
Figure 5B:
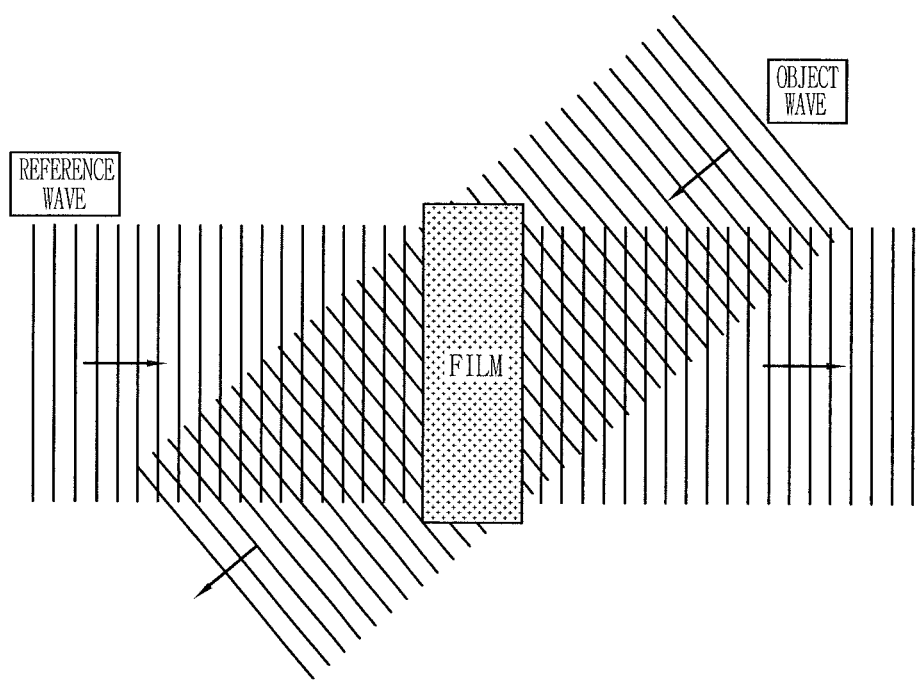
Figure 5C:
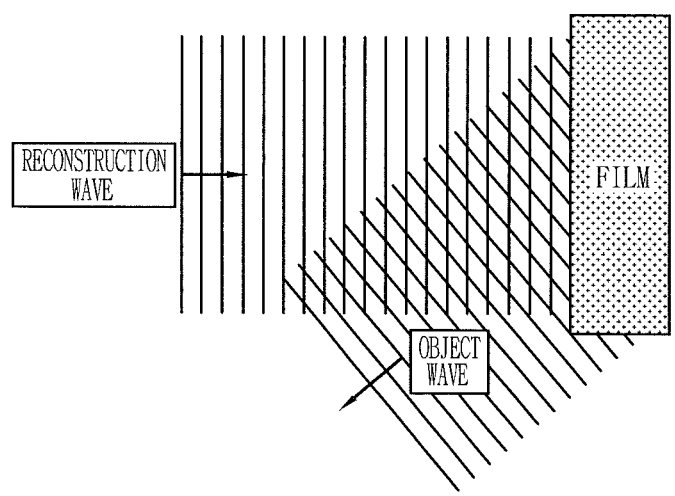

FIGS. 2A and 2B are conceptual views illustrating that a holographic image is implemented through a hologram output unit. FIGS. 3A and 3B are conceptual views illustrating a hologram principle. FIGS. 4A to 4C are conceptual views illustrating a transmission-type holography method. And FIGS. 5A to 5C are conceptual views illustrating a reflection-type holography method.

As aforementioned, the mobile terminal of the present invention is provided with the hologram output unit 155, and is configured to output a holographic image through the hologram output unit 155. In order to support output of a holographic image through the hologram output unit 155, the memory 170 may store therein information about hologram interference patterns. The controller 180 may output information which can be visually output from the mobile terminal, through the hologram output unit 155 as a holographic image, by using the information stored in the memory 170.

The hologram output unit 155 may be provided on at least one of a front surface, a rear surface and a side surface of the terminal body, and may be configured to output a holographic image 155' to a space above the rear surface of the terminal body.

FIGS. 2A and 2B are conceptual views illustrating that a holographic image 155' is implemented through the hologram output unit 155 shown in FIGS. 1B and 1C.

Referring to FIG. 2A, the hologram output unit 155 may be disposed on a front surface of the mobile terminal 100. The hologram output unit 155 may be operated independently from the display unit 151. As shown, the hologram output unit 155 may be configured to output the holographic image 155' even when no visual information has been displayed to the display unit 151. The hologram output unit 155 may be mounted to a bezel portion formed to enclose the display unit 151.

As shown, the output unit (or the haptic module 153, or a feedback output unit) configured to transmit a feedback signal may be disposed near the hologram output unit 155, and may be configured to transmit a feedback signal to a user, in response to a gesture of the user with respect to a hologram object output through the hologram output unit 155.

An optical source configured to output light so as to output a hologram object, and the haptic module 153 configured to output a feedback signal may be arranged independently from each other.

Although not shown, the optical source for outputting a hologram object, and the haptic module 153 for outputting a feedback signal may have the same optical source. In this case, the controller 180 may control an intensity of laser corresponding to the optical source for outputting a hologram object, thereby implementing a feedback signal with the intensity of the laser.

As shown in FIG. 2B, the hologram output unit 155 may be disposed on a rear surface of the mobile terminal 100, and may be configured to output the holographic image 155' in a preset space above the rear surface of the mobile terminal.

The mounting position of the hologram output unit 155, and the output space of the holographic image 155' are not limited to the aforementioned ones. The hologram output unit 155 may be formed to be rotatable or pop-up, and may be detachably installed at the terminal body as an additional device. The holographic image 155' may be output to a space unrelated to an installation direction of the hologram output unit 155, in a tilting manner, or through an additional reflection structure, etc.

The holographic image 155', which can be implemented through the hologram output unit 155, may include a two-dimensional (2D) planar image and a three-dimensional (3D) stereoscopic image.

A planar display method, a monoscopic method for providing the same image to two eyes, is configured to arrange a polyhedron generated by one or more points, lines and planes or a combination thereof, in a virtual stereoscopic space, and to display an image obtained as the polyhedron is viewed from a specific view point.

Next, a stereoscopic display method, a stereoscopic method for providing different images to two eyes, is a method that allows a user to feel a cubic effect when he or she views an object with naked eyes. That is, a human's two eyes view different planar images when viewing the same object, due to a distance therebetween. The different planar images are transmitted to the brain through the retinas, and the brain synthesizes the images with each other. As a result, the human feels a depth and a reality of a stereoscopic image. A human may feel a cubic effect by a distance between two eyes, i.e., a binocular disparity, even if there is a difference by person. A method for displaying an image using such a binocular disparity is a stereoscopic display method.

The holographic image 155' formed by the hologram output unit 155 to be explained later, may include both the 2D image and the 3D image. Hereinafter, for the sake of explanation, an image representation by a planar display method may include an image representation by a stereoscopic display method.

Hereinafter, a method for displaying the holographic image 155', and a structure to implement the holographic image 155' according to the present invention will be explained in more detail.

An image output to the display unit 151 merely records a distribution of bright and dark surfaces of an object, whereas the holographic image 155' may be understood as an image which simultaneously accumulates and reproduces all of information which light as wave contains, namely, an amplitude and a phase.

FIGS. 3A and 3B are conceptual views illustrating a hologram principle.

Referring to FIG. 3A, coherent light output from a laser optical source 201 is divided into two beams through a splitter 202.

One of the two beams is used to illuminate a subject 207, and light diffusely-reflected from the surface of the subject 207 reaches a holographic photosensitive material 205. Hereinafter, such a beam is called an object wave. For conversion of a path of the beam, mirrors 203, 204 may be used.

The other of the two beams reaches a mirror 208 along a converted path, and scatters through a lens 206, thereby directly reaching a front surface of the holographic photosensitive material 205. Hereinafter, such a beam is called a reference wave.

As the object wave and the reference wave interfere with each other on the holographic photosensitive material 205, about 500□1,500 interference patterns per 1 mm, which are very delicate and complicated, are generated. A holography storage medium where such interference patterns are recorded, is called a hologram.

Then, as shown in FIG. 3B, when the beams such as the reference waves, namely, reconstruction waves are projected to the holographic photosensitive material 205, the interference fringes may serve as diffraction grating, such that the beams can be diffracted at different positions from an incident direction of the reference waves. The diffracted beams may be converged so as to be formed the same as the beams initially reflected from the object, thereby projecting a holographic image 209. That is, the initial object waves may be reconstructed through the hologram so as to realize the holographic image 209.

Here, when viewed from an inside of a reconstructed wave front, the original object is viewed but it seems like the object is located inside. And, if a viewing point (view point) is moved, a position where the object is viewed is also changed. It feels like to view a 3D image. Also, since the wave front of the original object is reconstructed, it may cause interference against a wave front which comes from a very slightly deformed object.

A display method of the holographic image 209 may be divided into a transmission-type display method and a reflection-type display method according to a reconstruction method. FIGS. 4A to 4C are conceptual views illustrating a transmission-type holography method, and FIGS. 5A to 5C are conceptual views illustrating a reflection-type holography method.

The transmission-type holography method is a method of illuminating from a rear side of a hologram, and viewing a transmitted image in front of the hologram. In the transmission-type holography method, an object wave and a reference wave are exposed to a holographic photosensitive material in the same direction upon producing a holographic image, and a generated holographic image has a vivid and bright color.

Referring to FIG. 4A, light emitted from a laser optical source 301 passes through a spatial filter 302, and then scatters to a smooth spherical wave. The spherical wave is divided into two beams by a beam splitter 305. One of the two split spherical waves is irradiated onto an object 308, thereby forming an object wave. The other of the spherical wave is irradiated onto a holographic photosensitive material 307, thereby forming a reference wave. The object wave irradiated onto the object 308 is also irradiated onto the holographic photosensitive material 307. For conversion of a path of the beams, mirrors 304, 306, 309 may be used.

As the object wave and the reference wave irradiated onto the holographic photosensitive material 307 interfere with each other, interference patterns are generated. The generated interference patterns are recorded in the holographic photosensitive material 307.

That is, as shown in FIG. 4B, both the object wave and the reference wave are projected onto the same surface of the holographic photosensitive material 307, thereby generating interference patterns.

Then, as shown in FIG. 4C, if a reconstruction wave which is the same as the reference wave is projected onto the holographic photosensitive material 307, the object wave is projected in an opposite direction to the surface on which the object wave and the reference wave have been previously incident. As a result, a holographic image is generated.

A reflection-type holography method, a method for observing an image by illuminating a front side of a hologram and then viewing a reflected image in front of the hologram, is manufactured to make an object wave and a reference wave incident onto a holographic photosensitive material in opposite directions. A holographic image generated by the reflection-type holography method has an excellent cubic effect.

Referring to FIG. 5A, like in FIG. 4A, light emitted from a laser optical source 401 passes through a spatial filter 402, and then scatters to a smooth spherical wave. The spherical wave is divided into two beams through a beam splitter 405. One of the two beams is irradiated onto an object, thereby forming an object wave. The other of the two beams is irradiated onto a holographic photosensitive material 407 (photosensitive film), thereby forming a reference wave. For conversion of a path of the beams, mirrors 404, 406, 409 may be used. Unlike in FIG. 4A, the reference wave and the object wave are irradiated onto the holographic photosensitive material 407 from opposite positions to each other.

That is, as shown in FIG. 5B, the reference wave is projected onto a left surface of the holographic photosensitive material 407, and the object wave is projected onto a right upper surface of the holographic photosensitive material 407. Then, as shown in FIG. 5C, if a reconstruction wave which is the same as the reference wave is projected onto the holographic photosensitive material 407, the object wave is transmitted in an opposite direction. As a result, a holographic image is generated.

The holographic image may be displayed according to a preset holography pattern, according to an embodiment of the present invention. The holography pattern means that a holographic image projected through the hologram output unit 155 is changed into a preset pattern to thus be provided to a user.

The holography pattern may be variously set according to a method which is to be explained later.

Firstly, the holography pattern may be set as a distance between the hologram output unit and a holographic image is changed according to lapse of time. With such a structure, since a holographic image projected through the hologram output unit 155 is moveable up and down, a predetermined holography pattern can be set.

Secondly, the holography pattern may be set as a shape of a holographic image projected from the hologram output unit 155 is changed according to lapse of time. For instance, the controller 180 may control a holographic image projected from the hologram output unit 155 to have a circular shape. Then, the controller 180 may control the circular shape of the holographic image to be changed into a quadrangular shape, as time lapses.

A holographic image projected from the hologram output unit 155 may be moved right and left, or may be rotated. That is, the holography pattern may be set by moving a projected holographic image right and left, rotating the holographic image, or rotating the holographic image with moving the holographic image right and left, in a state where a distance between the hologram output unit 155 and the holographic image is constantly maintained.

Alternatively, the holography pattern may be set as a color or a size of a projected holographic image is changed according to lapse of time. Further, the holography pattern may be set by controlling a projection brightness or a reconstruction frequency (the number of times of reconstruction), or by performing illumination (lighting), vibration feedback, sound insertion, image insertion, repetitive projection, etc.

In the above descriptions, the holography pattern is set by an individual factor. However, the holography pattern may be set by a plurality of factors. For instance, the holography pattern may be set as a holographic image is rotated while the holographic image is moved right and left, in a state where a distance between the hologram output unit 155 and the holographic image is changed according to lapse of time.

In the above descriptions, a holography pattern is set with respect to an entire region of a holographic image. However, this is merely exemplary. That is, a hologram pattern may be applicable to a partial region of a holographic image.

So far, the transmission-type holography display method and the reflection-type holography display method were explained. However, a holographic image may be output in various manners.

A holography method may be categorized into three according to a generation and reproduction method of a hologram. The holography method may include i) an analogue holography method such as the aforementioned transmission-type holography display method and the reflection-type holography display method, ii) a digital holography method for generating a hologram by 3D digital data captured by an imaging sensor such as a CCD camera or a CMOS sensor, and for storing, processing and editing the generated hologram, and iii) a pseudo holography method for implementing a hologram effect by capturing a stereoscopic image of ultra-multi view points even if it is not a complete hologram, and for imitating a hologram image effect by projecting an image through a semi-transmissive screen.

The pseudo holography method includes a free-format method, a peppers ghost method, and a Leia display system.

The 3D holography method includes a project vermeer, a voixe box, a 3D midair plasma display method, etc.

In the mobile terminal according to the present invention, a holographic image may be implemented by one of the aforementioned methods, or by a method rather than the aforementioned methods.

The holographic image is a three-dimensional (3D) image output to an arbitrary space. In order to touch the holographic image, a user should locate his or her hand to the arbitrary space where the holographic image has been output. However, the user cannot substantially touch the holographic image, since the holographic image is not an entity, but an image output to a 3D-space. Thus, the present invention provides a mobile terminal capable of providing a user's experience to feel that the user substantially touches a holographic image or an object corresponding to the holographic image, and a control method thereof.

The present invention is to provide an interaction between a holographic image and a user, and a more realistic user interaction based on a characteristic of an object corresponding to a hologram object.

Hereinafter, a method for providing an interaction between a holographic image and a user will be explained in more detail with reference to the attached drawings.

Figure 6:
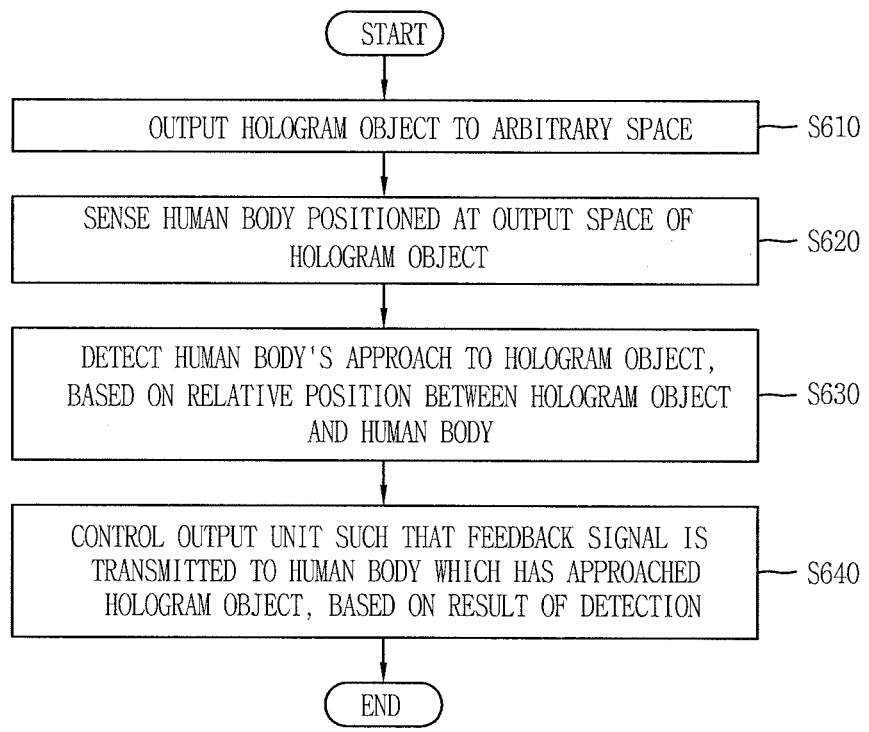
FIG. 6 is a flowchart illustrating a method for controlling a mobile terminal, for interaction between a hologram object and a user, according to the present invention.
Figure 7:
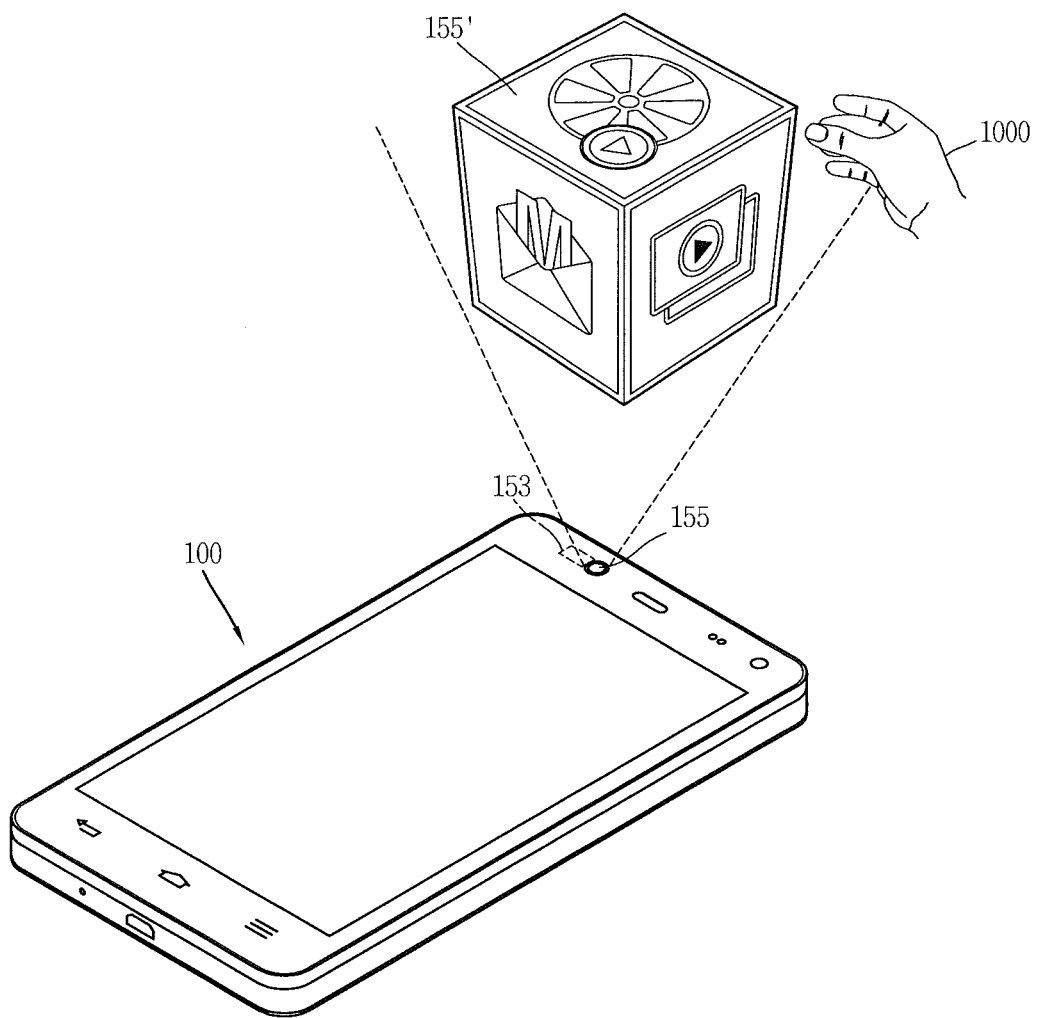
FIG. 7 is a conceptual view illustrating an interaction between a hologram object and a user, in a mobile terminal according to the present invention.

FIG. 6 is a flowchart illustrating a method for controlling a mobile terminal, for interaction between a hologram object and a user, according to the present invention, and FIG. 7 is a conceptual view illustrating an interaction between a hologram object and a user, in a mobile terminal according to the present invention.

For interaction between a holographic image output from the mobile terminal according to the present invention and a user, a hologram object is output to a preset space (S610). The hologram object may mean a holographic image, or part of the holographic image. The part of the holographic image may be a specific image included in the holographic image. The specific image may be an image corresponding to any object. Hereinafter, a holographic image output through the hologram output unit 155 will be called a 'hologram object'.

The hologram object is output through the hologram output unit 155, and may be output to a preset space (preset 3D space). The preset space may correspond to a projection range of the hologram output unit 155.

As shown in FIG. 7, a hologram object 710 may be output to a preset space. In the output state of the hologram object 710, a step (S620) of sensing a human body 1000 (e.g., a user's hand, refer to FIG. 7) disposed in the preset space is executed (refer to FIG. 6). In this specification, the human body is located at the preset space. However, the present invention is not limited to this. That is, in the present invention, an object positioned at the preset space may be also sensed.

In the present invention, not only a human body positioned at the preset space, but also a human body positioned at an output region of the hologram object 710 and a peripheral region may be sensed.

In the mobile terminal of the present invention, a position of the sensing unit 140 may be preset such that a preset space corresponding to a projection range where the output unit 155 projects a hologram object, is sensed.

The sensing unit (or sensing means) for sensing a human body positioned at the preset space may be implemented in various manners. For instance, the sensing unit may be implemented as a 3D camera.

More specifically, in the mobile terminal according to the present invention, the camera 121 may include a 3D camera or a depth camera. In the present invention, an image sensor provided at a 3D camera (depth camera) may be configured to sense a human body positioned at an arbitrary space (or a preset space) to which a holographic image (or a hologram object) is output. The image sensor may be configured to sense a user's body, and to sense a user's gesture applied to an arbitrary space. In the mobile terminal according to the present invention, an image having a cubic effect (or a 3D image), which corresponds to an object (or a human body) positioned near a hologram object, or an object (or a user body) approaching a hologram object, may be acquired by the 3D camera.

The image sensor is not always activated, but may be activated only when a hologram object has been output. In a case where a hologram object has been output, if it is sensed by the proximity sensor, the illumination sensor, etc. that an object (or a user's body) is positioned near the hologram object, the controller may activate the image sensor such that the body's approach to the hologram object is sensed.

In the present invention, a body's approach to a hologram object is sensed based on sensing information acquired by the image sensor (S630). More specifically, the controller 180 detects a body's approach to a hologram object, based on a relative position between the hologram object and the body.

The body's approach to the hologram object may be understood as a user's gesture with respect to the hologram object. The controller 180 may determine user's various gestures with respect to the hologram object, based on sensing information acquired by the image sensor, e.g., according to whether a user approaches a hologram object (i), a user touches a hologram object (ii), a user scrubs a hologram object (iii), a user passes through a hologram object (iv), a user pushes a hologram object at a constant speed (v), etc.

For instance, the controller 180 may compare coordinates information of an output position of the hologram object, with coordinates information of the human body, based on an image acquired from the image sensor. The controller 180 determines a relative position between the hologram object and the human body, based on the coordinates information. If the coordinates information of the human body is the same or similar to the coordinates information of the hologram object as a result of the comparison, it may be determined that the human body has approached (i), contacted (ii), or passed through the hologram object (iii).

The coordinates information of the hologram object and the coordinates information of the human body may be acquired through modeling with respect to the hologram object and the human body, respectively. A method for modeling the hologram object and the human body will be explained in more detail with reference to FIGS. 8A to 8C.

Once the human body's approach to the hologram object is detected, the controller 180 controls the output unit based on a result of the detection, such that a feedback signal is transmitted to the human body which has approached the hologram object (S640).

That is, in the present invention, a feedback signal is transmitted to an object which has approached a hologram object, such that a user feels as if he or she substantially touches the object corresponding to the hologram object.

The feedback signal may be implemented in various manners. For instance, the output unit may include at least one of a laser output module and a sound wave output module. The feedback signal may include at least one of laser output through the laser output module, and a sound wave output through the sound wave output module. The laser or the sound wave has a predetermined intensity (e.g., strength or amplitude), a period (e.g., frequency), a waveform (e. g., pulse wave, sine wave, etc.). The laser or sound wave output through the output unit is transmitted to a user's body, so the user may have an experience to substantially touch a hologram object. The feedback signal may be also called a 'haptic signal'. The output unit may be implemented as the haptic module 153.

The controller 180 may acquire coordinates information of a target point where a feedback signal is to be transmitted, based on coordinates information obtained after modeling a human body which has approached a hologram object. That is, the controller 180 may utilize coordinates information of the modeled human body, such that a feed back signal is transmitted to a position where the human body is currently positioned. In this case, the controller 180 may output a feedback signal not to all regions where a hologram object has been output, but only to a region where the human body is positioned.

In the present invention, the hologram output unit 155 may be independently implemented from an output unit for outputting a feedback signal. That is, the hologram output unit 155 may be independently operated regardless of an activated or inactivated state of the output unit for outputting a feedback signal. In this case, the hologram output unit 155 and the output unit for outputting a feedback signal, may have separate configurations. That is, the hologram output unit 155 may be implemented as an optical source such as an LED or a laser of a visible ray range. And the output unit for outputting a feedback signal may be implemented as a laser output module, a sound wave output module, an ultrasonic wave output module, a wind output module, a mist output module or the like separately provided from the hologram output unit 155.

If the human body's approach to the hologram object is detected in an inactivated state of the output unit, the controller 180 may convert the inactivated state of the output unit into an activated state, such that a feedback signal is output. That is, the output unit, which is in an inactivated state in ordinary times, is converted into an activated state when a feedback signal is to be output. The inactivated state means an 'off' state, and the activated state means an 'on' state.

In the present invention, the output unit is controlled to output a feedback signal only when a user's approach to a hologram object is sensed. This can reduce power consumption more than in a case where the output unit is always in an 'on' state.

Further, in the present invention, when a human body has approached a hologram object, a feedback signal is output only to the human body, not to an entire region of the hologram object, based on coordinates information of the human body. This can reduce power consumption more than in a case where a feedback signal is output to the entire region of the hologram object In the mobile terminal according to the present invention, when there is a function associated with a user's contact part, the controller may execute the function. For instance, if a hologram object of a user's contact part is an icon, the controller may execute a function related to the icon. In this case, the hologram output unit 155 may output screen information corresponding to an executed function, in the form of a hologram.

As aforementioned, in the mobile terminal and the control method according to the present invention, when a human body's approach to a hologram object is sensed, a feedback signal is output to the human body. This can allow a user to have a sense of substantially touching a hologram object. Hereinafter, the present invention will be explained in more detail.

Firstly, a method for detecting a human body's approach to a hologram object by modeling the hologram object and the human body, will be explained in more detail with reference to the attached drawings.

FIGS. 8A to 8E are conceptual views illustrating a method for modeling (rendering) a hologram object and a user's body, in the mobile terminal according to the present invention.

Figure 8A:
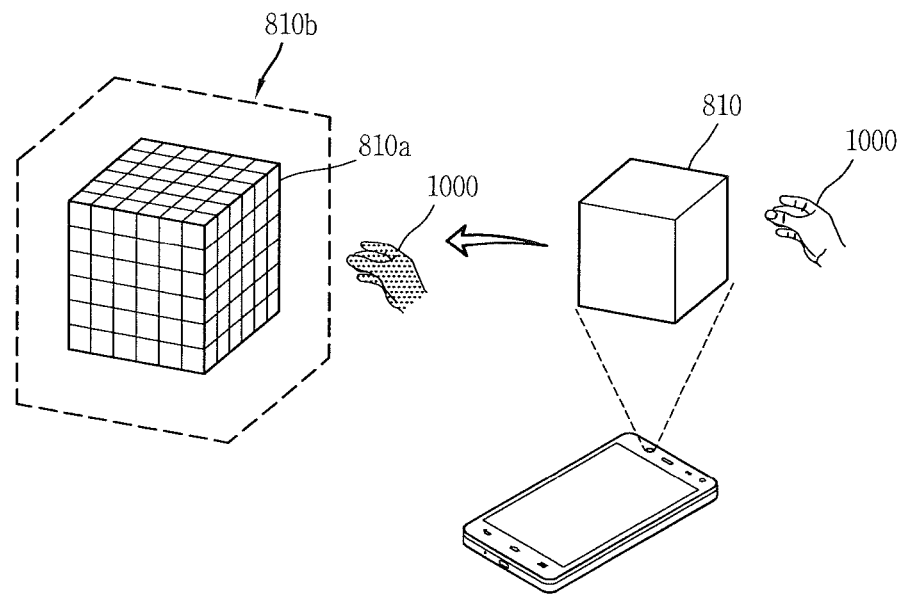
FIGS. 8A to 8E are conceptual views illustrating a method for modeling a hologram object and a user's body, in a mobile terminal according to the present invention.

As shown in FIG. 8A, the mobile terminal may model a hologram object 810, and a human body sensed by the image sensor.

Referring to FIG. 8A, the controller 180 may model the hologram object 810, a peripheral region of the hologram object 810, and a human body 1000. As a result of the modeling, there may exist a first modeling object 810a corresponding to the hologram object 810, a second modeling object 810b corresponding to the peripheral region of the hologram object 810, and a third modeling object 1000a corresponding to the human body.

The peripheral region may be a region within a predetermined distance, based on an output region of the hologram object 810. A range of the peripheral region may be set under control of the controller 180, or according to a user's selection.

The controller 180 executes modeling with respect to the hologram object 810, the peripheral region, and the sensed human body, and applies a preset physical engine to modeled objects to execute a collision detection. Through the collision detection, the controller 180 may detect whether a collision has occurred among the human body, the hologram object 810 and the peripheral region.

For instance, once first to third modeling objects 810a, 810b, 1000a are modeled, the controller 180 may acquire coordinates information of the modeling objects. With such a structure, the controller 180 may recognize an output position of the hologram object 810 in the preset space, and may recognize a peripheral region of the hologram object 810.

Modeling the human body may mean capturing a human body using a 3D camera, and modeling an image object corresponding to the human body included in a captured image.

The controller 180 may acquire coordinates information of the hologram object 810 and the peripheral region of the hologram object 810 through the modeling, and acquire coordinates information of the human body. Then, the controller 180 may compare the coordinates information with each other, thereby determining a relative position between the peripheral region of the hologram object 810 and the human body.

The controller 180 may compare coordinates information of an output position of the hologram object, coordinates information of the peripheral region, and coordinates information of the human body, with one another. Then, the controller 180 may determine whether the coordinates information of the human body is the same as the coordinates information of the hologram object 810 or the peripheral region. Based on a result of the comparison, the controller 180 may determine that the human body has approached the hologram object (i), has contacted the hologram object (ii), or has passed through the hologram object (iii).

In a preset space where the hologram object 810 is output, coordinates information of a first region where the hologram object 810 is positioned, coordinates information of a second region (or the peripheral region) adjacent to the first region, and coordinates information of a region where the human body is positioned, may be acquired through a specific type of modeling with respect to the hologram object and the human body.

Figure 8B:
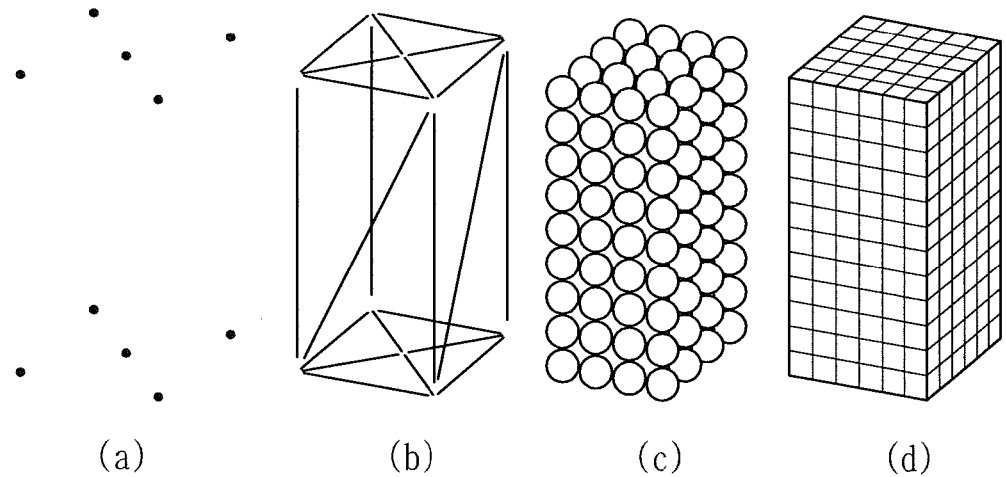

FIG. 8B is a conceptual view illustrating a plurality of modeling types. A method for modeling a hologram object may include a vertex-based modeling type as shown in FIG. 8B(a), a line (edge)-based modeling type as shown in FIG. 8B(b), a sphere-based modeling type as shown in FIG. 8B(c), and a mesh-based modeling type as shown in FIG. 8B(d).

As shown in FIG. 8B(a), according to the vertex-based modeling type, when a user is to select a specific region of a hologram object, the controller 180 may activate vertexes of part corresponding to the specific region, among the modeled hologram object, thereby recognizing the user's approach to the hologram object.

As shown in FIG. 8B(b), according to the line (edge)-based modeling type, when a user is to select a specific region of a hologram object, the controller 180 may activate lines of part corresponding to the specific region, among the modeled hologram object, thereby recognizing the user's approach to the hologram object.

As shown in FIG. 8B(c), according to the sphere-based modeling type, when a user is to select a specific region of a hologram object, the controller 180 may activate spheres of part corresponding to the specific region, among the modeled hologram object, thereby recognizing the user's approach to the hologram object.

As shown in FIG. 8B(d), according to the mesh-based modeling type, when a user is to select a specific region of a hologram object, the controller 180 may activate meshes of part corresponding to the specific region, among the modeled hologram object, thereby recognizing the user's approach to the hologram object.

The above vertex-based modeling type, the line (edge)-based modeling type, the sphere-based modeling type, and the mesh-based modeling type have been well known to those skilled in the art, and thus detailed explanations thereof will be omitted.

A modeling type of the hologram object and a modeling type of the peripheral region of the hologram object may be the same or different from each other.

Figure 8C:
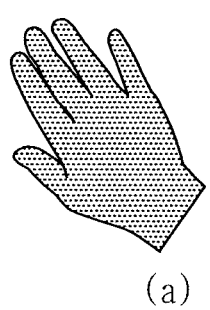
Figure 8C:
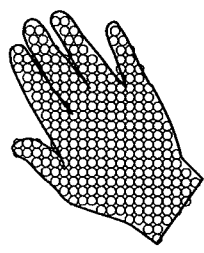
Figure 8C:
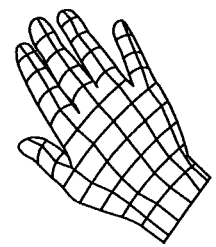

As shown in FIG. 8C, a user's body may be modeled by one of the aforementioned plurality of modeling types. For instance, the controller 180 may model a human body approaching a hologram object, based on an image acquired from a 3D camera (or a depth camera). More specifically, the controller 180 may apply a dot modeling type shown in FIG. 8C(a), a sphere modeling type show in FIG. 8C(b), or a mesh modeling type shown in FIG. 8C(c). As a result of such a modeling, a shape of the human body may be implemented as shown.

The controller 180 may model a human body (more specifically, a user's hand) using a position recognition sensor such as a ring type, a thimble type or a glove type, rather than the 3D camera.

As shown, the controller 180 detects a human body's approach to a hologram object, based on a modeling result with respect to the hologram object and the human body. The controller 180 determines whether a 3D point is included in a human body's 3D point (coordinates information) acquired as a result of the modeling, and in a model of a hologram object (e.g., mesh model, or coordinates information of a model corresponding to a hologram object). Alternatively, the controller 180 determines whether there is a sphere including a human body's 3D point, among spheres which constitute a hologram object, thereby sensing the human body's approach to the hologram object.

Still alternatively, the controller 180 determines whether there is a vertex or a line corresponding to a human body's 3D point, among vertices or lines which constitute a hologram object, thereby sensing the human body's approach to the hologram object.

The coordinates information of the hologram object, the peripheral region, and the human body, which has been acquired based on the aforementioned modeling, may be variable according to each modeling type. For instance, coordinates values by a sphere-based modeling type may be different coordinates values by a line-based modeling type.

In the above descriptions, it is determined whether a human body's 3D point is included in a model corresponding to a hologram object. But this may be understood as a determination whether a human body's 3D point (coordinates information) corresponds to coordinates information of a model corresponding to a hologram object.

Figure 8D:
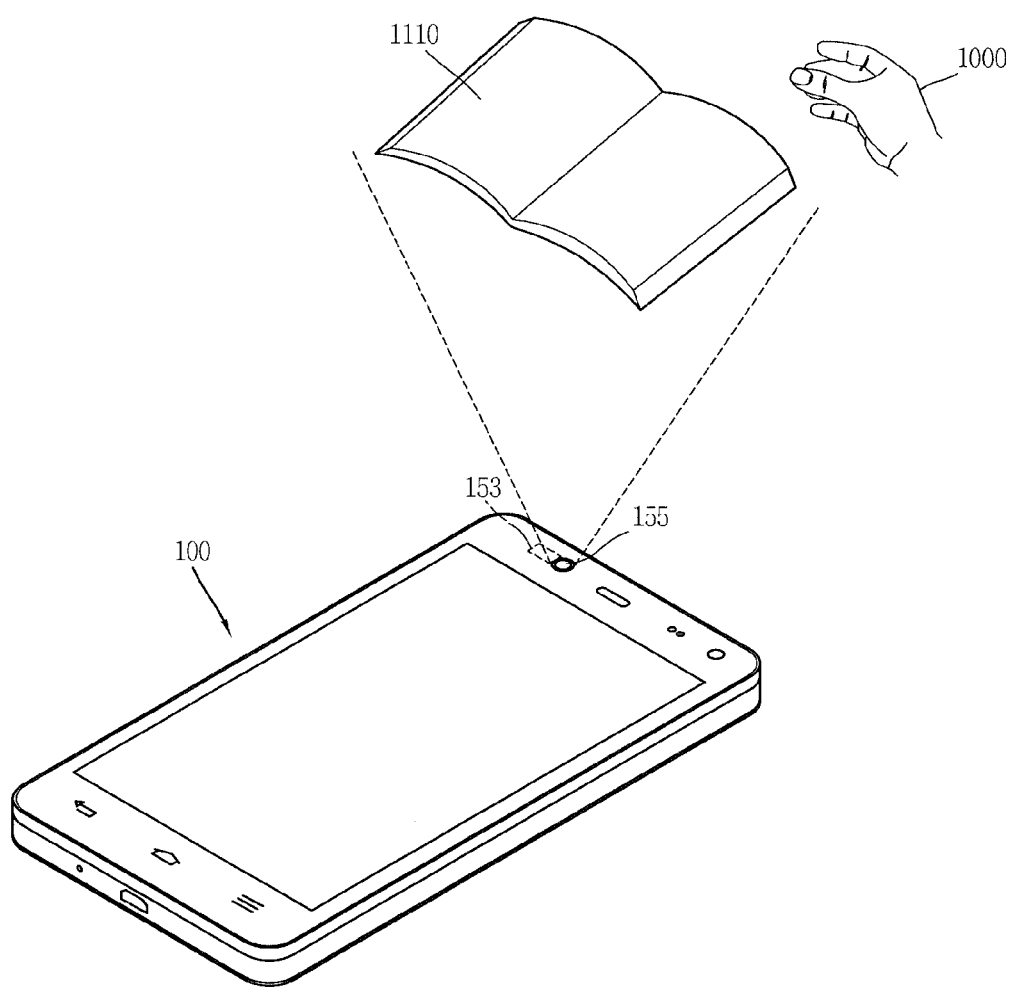
Figure 8E:
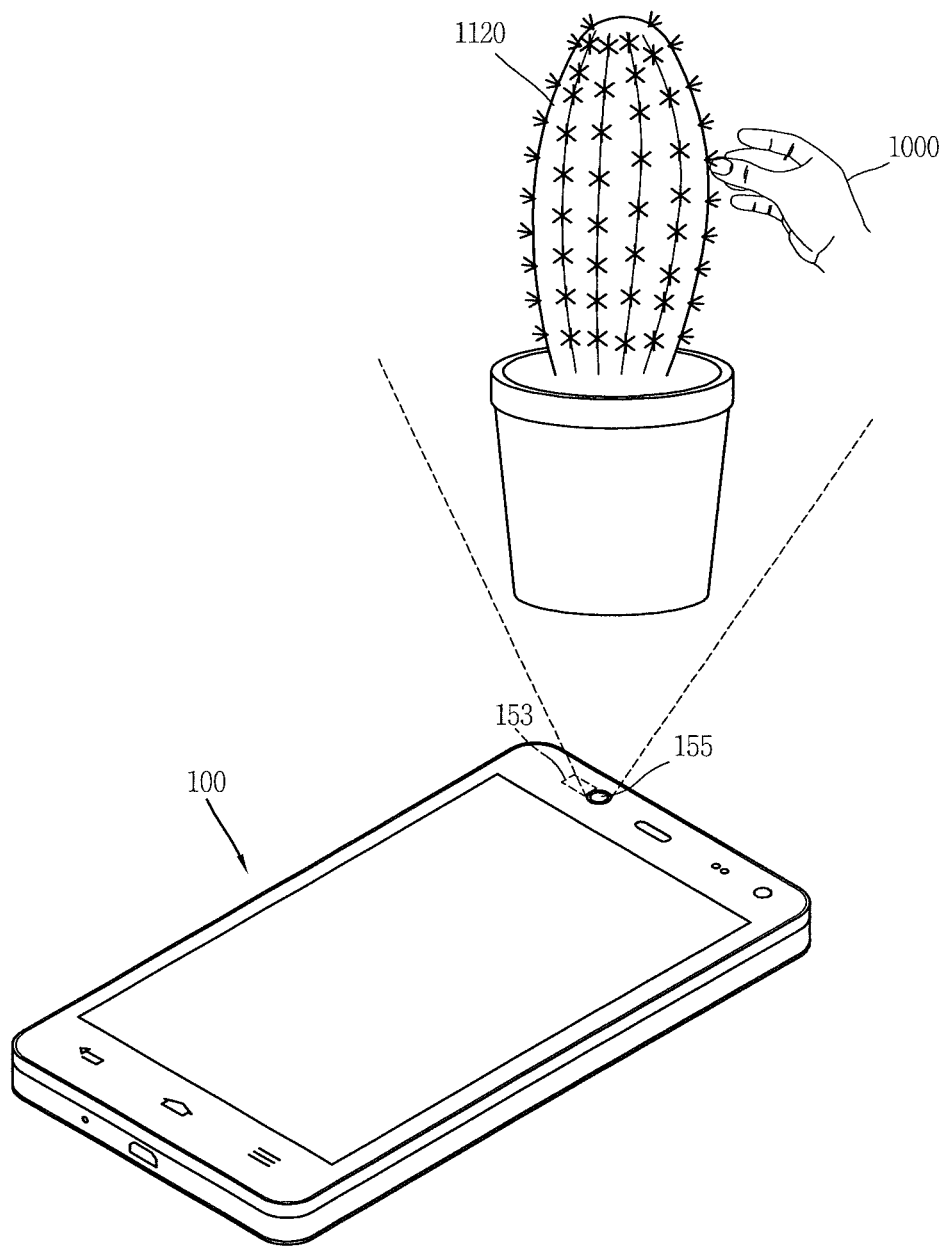

In the mobile terminal according to the present invention, a hologram object may be modeled by a modeling type based on a characteristic of an object, among a plurality of modeling types. The controller 180 may model a hologram object, based on a characteristic of an object corresponding to the hologram object. The characteristic of the object corresponding to the hologram object may include at least one of a type, a weight, a size, an intensity, a shape and a surface of the object. For instance, as shown in FIG. 8D, if an object corresponding to a hologram object has a monotonous appearance (e.g., a book), the controller 180 may model the hologram object by a comparatively simple modeling type rather than a complicated modeling type. Alternatively, as shown in FIG. 8E, if an object corresponding to a hologram object has a complicated appearance (e.g., a cactus), the controller 180 may model the hologram object by a complicated modeling type, in order to determine a region or part to which a user has approached.

The controller may execute a modeling for visually outputting a hologram object, and a modeling for detecting a human body's approach to a hologram object, in a different manner. For instance, as shown in FIG. 8D, since a book has the same texture or shape entirely, a user has a similar tactile sense regardless of a touched region. Thus, the controller 180 models an object having such a characteristic, by a comparatively simple modeling type. As another example, as shown in FIG. 8E, since a cactus has a different texture or shape entirely, a user has a different tactile sense according to a touched region. Thus, the controller 180 models an object having such a characteristic, by a detailed modeling type.

The controller may model part of an object corresponding to a hologram object, the part to be contacted (e.g., button, protrusion (handle), etc.). Then, the controller may detect whether a user has contacted or approached the part to be contacted.

Alternatively, the controller may execute a different modeling type with respect to a single hologram object, according to a region. And the controller may model part to be contacted (e.g., a button or a protrusion), in a more detailed manner.

As aforementioned, in the mobile terminal according to the present invention, a human body's approach to a hologram object may be determined through modeling of the human body and the hologram object, and a feedback signal may be output to the human body.

Hereinafter, examples to output a feedback signal will be explained in more detail with reference to the attached drawings.

FIGS. 9A to 9G are conceptual views illustrating a position relation between a hologram object and a user's body, in a mobile terminal according to the present invention. FIGS. 10A to 10O are conceptual views illustrating a feedback signal according to the present invention. FIGS. 11A to 11D are conceptual views illustrating a characteristic of an object corresponding to a hologram object.

In the mobile terminal according to the present invention, a feedback signal may be transmitted to a human body, not only when a user's body is positioned within an output region of a hologram object, but also when a user's body is positioned at a peripheral region of a hologram object.

Figure 9A:
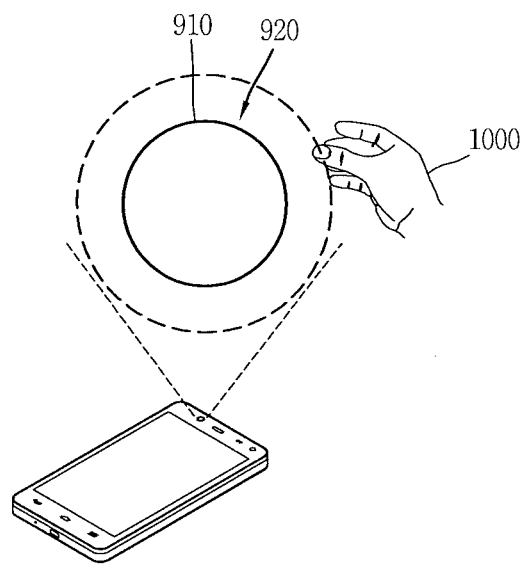
FIGS. 9A to 9G are conceptual views illustrating a position relation between a hologram object and a user's body, in a mobile terminal according to the present invention.
Figure 10A:
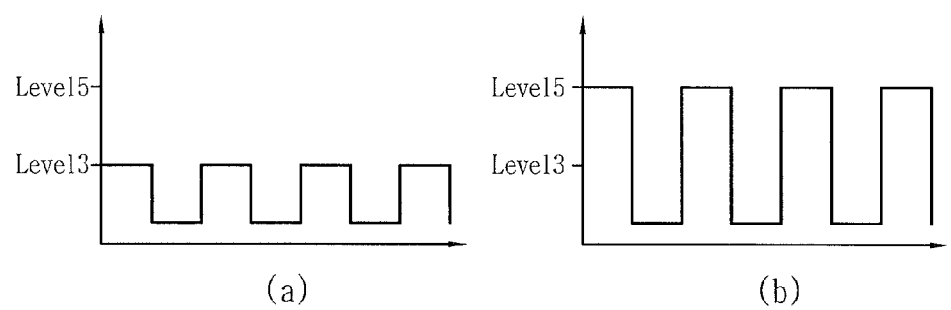
FIGS. 10A to 10C are conceptual views illustrating a feedback signal according to the present invention.

For instance, as shown in FIG. 9A, an output space of a hologram object may include a first region 910 where the hologram object is positioned, and a second region 920 (peripheral region) adjacent to the first region 910. The controller 180 may control the output unit to output a feedback signal when the human body 1000 is positioned on one of the first region 910 and the second region 920.

More specifically, when the human body is positioned either in the first region 910, or at a boundary of the first region 910, the controller 180 may determine that the human body is positioned at the first region 910.

When the human body is positioned between the first region 910 and the second region 920 and at a boundary of the second region 920, the controller 180 may determine that the human body is positioned at the second region 920.

As aforementioned, the controller 180 compares coordinates information of the first region 910 where the hologram object is positioned in a preset space, coordinates information of the second region 920 adjacent to the first region 910, and coordinates information of the human body 1000, with one another. Then, the controller 180 determines a relative position between the hologram object and the human body 1000, and determines whether the human body 1000 is positioned on the first region 910 or the second region 920 based on a result of the determination.

Figure 9B:
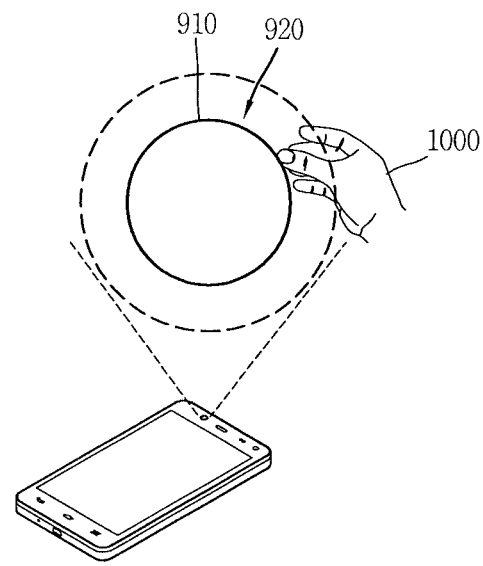
Figure 9C:
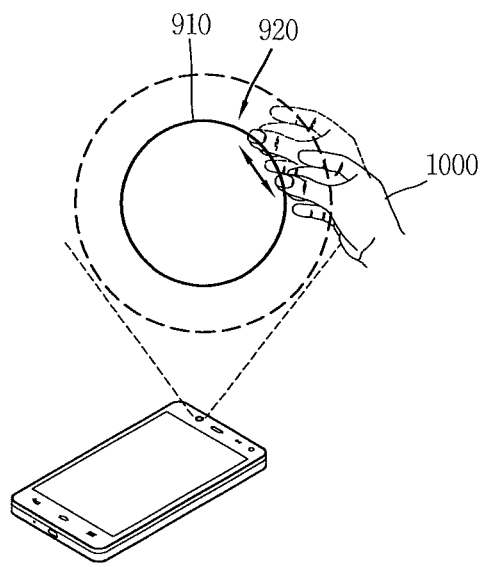
Figure 9D:
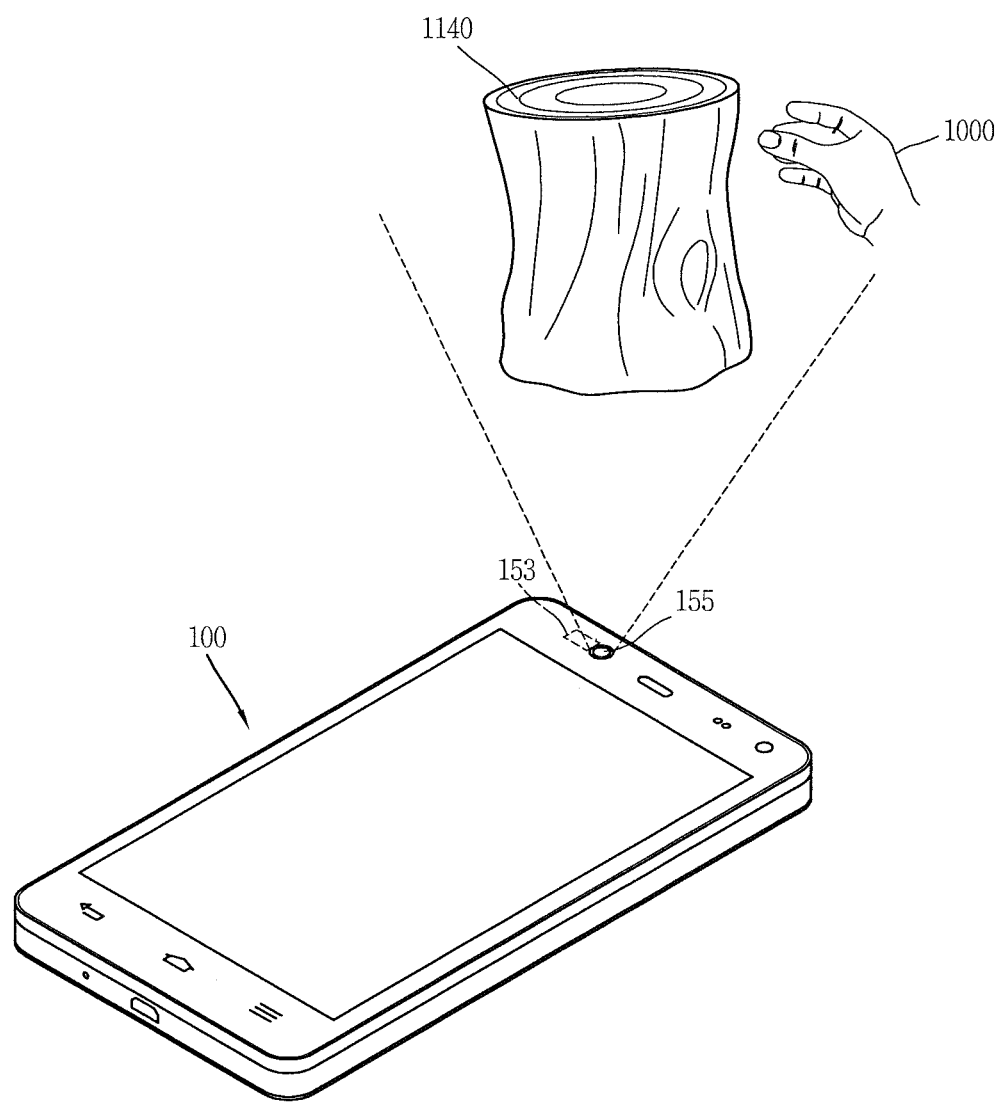
Figure 9E:
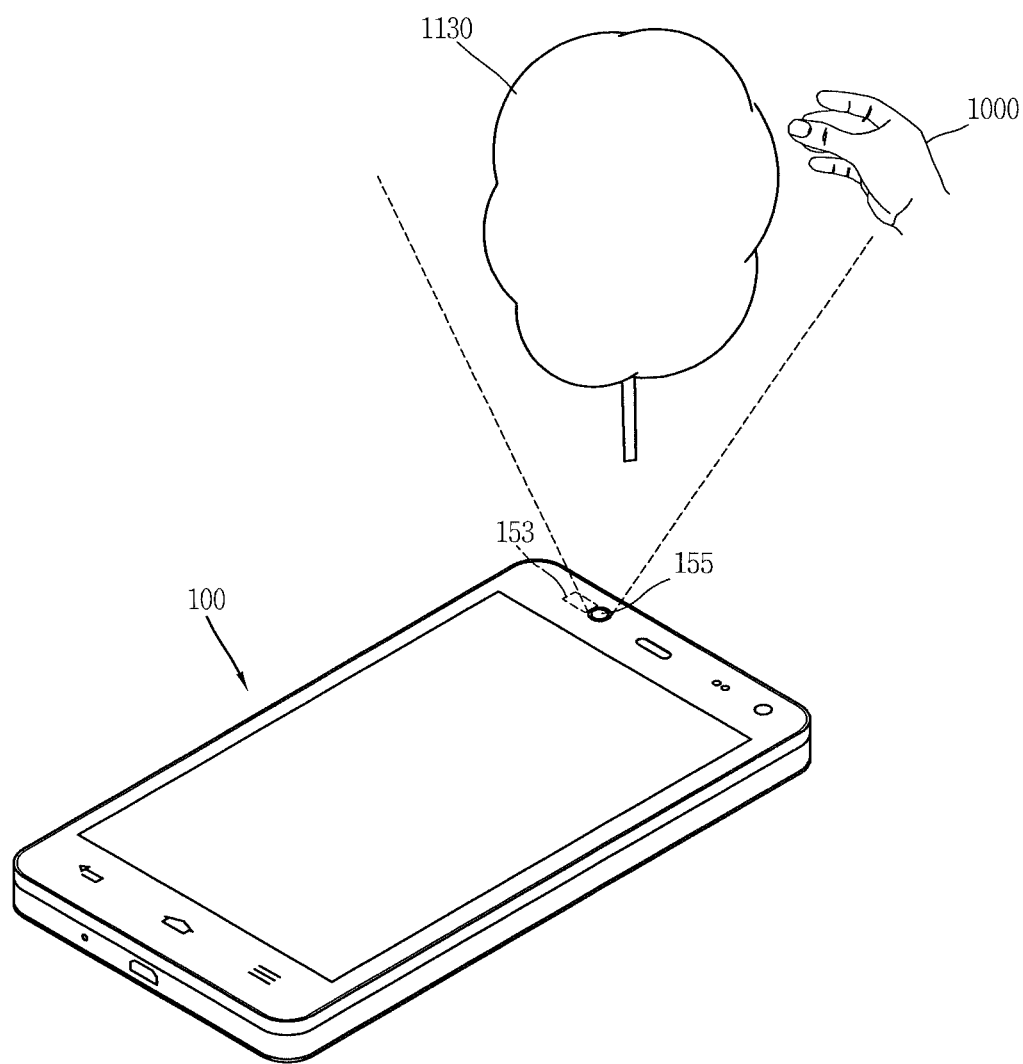

FIG. 9A illustrates that the human body 1000 is positioned on the second region 920, and FIGS. 9B to 9D illustrate that the human body 1000 is positioned on the first region 910. Especially, FIG. 9D illustrates that the human body 1000 has passed through a hologram object. In the present invention, a feedback control may be output not only when the human body 1000 is positioned at the first region 910, but also when the human body 1000 is positioned at the second region 920. The controller 180 may control the output unit to output a different feedback signal according to whether the human body 1000 is positioned at the first region 910 or at the second region 920.

A feedback signal according to the present invention may be defined by at least one of an intensity (e.g., strength or amplitude), a period (e.g., frequency), and a waveform (e.g., pulse wave, sine wave, etc.). That is, a characteristic of a feedback signal is determined by combination of an intensity, a period and a waveform of a signal. The controller 180 generates a different feedback signal by the output unit, by changing at least one of an intensity, a period and a waveform of a feedback signal. That is, the output unit may generate feedback signals different from each other in at least one of an intensity, a period and a waveform, under control of the controller.

Thus, when a feedback signal is formed as a laser or a sound wave, the controller 180 may generate a different feedback signal by controlling at least one of an intensity, an amplitude, a frequency and a waveform of the laser or the sound wave.

Figure 10B:
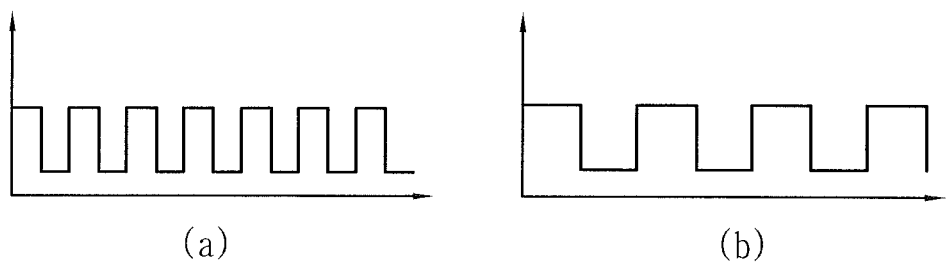

As shown in FIG. 10*a*, a signal strength may mean one of a signal intensity and a signal size. As shown in FIG. 10B, a signal period means a signal frequency. A signal shown in FIG. 10B(b) has a lower frequency than a signal shown in FIG. 10B(a). For instance, a feedback signal is implemented as a laser, the number of times that a laser signal having a frequency shown in FIG. 10B(a) reaches a human body is larger than the number of times that a laser signal having a frequency shown in FIG. 10B(b) reaches a human body.

Figure 10C:
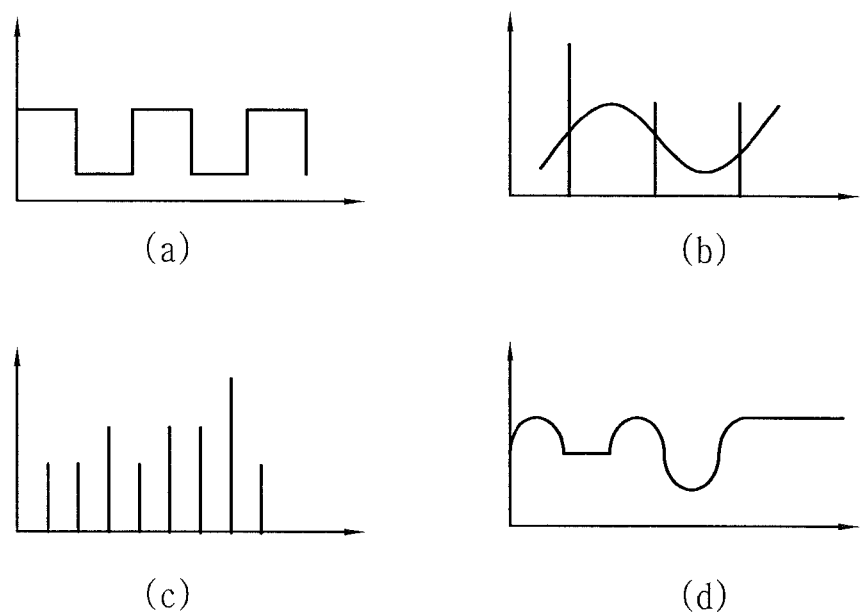

As shown in FIG. 10C, a signal waveform may be variable. For instance, the signal waveform may be a pulse wave shown in FIG. 10C(a), a sine wave shown in FIG. 10C(b), an impulse wave shown in FIG. 10C(c), etc. As shown in FIG. 10C(d), the signal waveform may be a combination of a plurality of waveforms. Further, in case of the same pulse wave, a different type of signal may be implemented according to a pulse width.

The controller 180 may output a signal having a higher frequency when the human body 1000 is on the first region 910, than when the human body 1000 is on the second region 920.

Also, the controller 180 may output a different feedback signal when the human body 1000 comes closer to a hologram object. For instance, when the human body 1000 comes closer to a hologram object, the controller 180 may output a signal of a higher frequency, or a signal of a higher intensity. Alternatively, when the human body 1000 comes closer to a hologram object, the controller 180 may output a feedback signal with changing a waveform such that the feedback signal has a different waveform.

The controller 180 may output a feedback signal having at least one of a different intensity, frequency and waveform, according to a distance between a hologram object and the human body 1000.

Alternatively, when the human body 1000 comes closer to a hologram object, the controller 180 may output a feedback signal having a linearly-increasing intensity, or a feedback signal having a nonlinearly-increasing intensity (e.g., nonlinearity such as logarithm).

On the contrary, when the human body becomes distant from a hologram object, the controller 180 may output a different feedback signal. In this case, an intensity of the feedback signal may be gradually decreased, or a frequency of the feedback signal may be gradually decreased.

In the present invention, a different feedback signal is output according to a distance between a hologram object and a human body. Thus, a user may feel that he or she is moving far away from or close to a hologram object.

The controller 180 may continuously output a signal having a predetermined intensity when the human body 1000 has reached a threshold range, e.g., when the human body 1000 has approached a hologram object or has reached within a preset distance.

The controller 180 may output a different feedback signal according to a speed of the human body 1000 which is approaching a hologram object, i. g., a collision speed of the human body 1000 against a hologram object. Under an assumption that there are a first speed and a second speed larger than the first speed, if the human body 1000 collides with the hologram object with the first speed, the controller 180 may output a signal having a first size. On the contrary, if the human body 1000 collides with the hologram object with the second speed, the controller 180 may output a signal having a second size larger than the first size.

Alternatively, when the human body 1000 collides with the hologram object with the first speed, the controller 180 may output a sine wave having a predetermined size. When the human body 1000 collides with the hologram object with the second speed, the controller 180 may output an impulse wave.

When the human body approaches the hologram object with a first speed, the controller 180 may output a first feedback signal. On the other hand, when the human body approaches the hologram object with a second speed different from the first speed, the controller 180 may output a second feedback signal different from the first feedback signal.

As shown in FIG. 9B, when the human body 1000 has contacted a hologram object, the controller 180 may output a different type of feedback signal according to a characteristic of an object corresponding to the hologram object. The characteristic of the object may include at least one of a type, a weight, a size, an intensity, a shape and a surface of the object.

The controller 180 may output a feedback signal the most suitable for a characteristic of an object, by controlling at least one of an intensity, a frequency and a waveform of a feedback signal, according to the characteristic of the object.

For instance, the controller 180 may control a feedback signal such that a user feels a texture of an object corresponding to a hologram object. For instance, if an object corresponding to a hologram object has a rough surface (e.g., tree) (refer to FIG. 9D), the controller 180 may output an impulse wave in response to a user's gesture to contact a hologram object (refer to FIG. 9B), or a user's gesture to scrub (touch) a hologram object (refer to FIG. 9C). As another example, if an object corresponding to a hologram object has a soft surface (e.g., cotton candy) (refer to FIG. 9E), the controller 180 may output a sine wave in response to a user's gesture to contact a hologram object (refer to FIG. 9B), or a user's gesture to scrub (touch) a hologram object (refer to FIG. 9C).

As still another example, if an object corresponding to a hologram object has a surface such as an irregular gravelly field, the controller 180 may output a feedback signal by combining at least two of a sine wave, a pulse wave and an impulse wave, in response to a user's gesture to contact a hologram object (refer to FIG. 9B), or a user's gesture to scrub (touch) a hologram object (refer to FIG. 9C).

The controller 180 outputs a different feedback signal in response to a user's gesture with respect to a hologram object. In this case, a characteristic of a feedback signal may be determined according to a characteristic of an object corresponding to the hologram object.

Figure 9F:
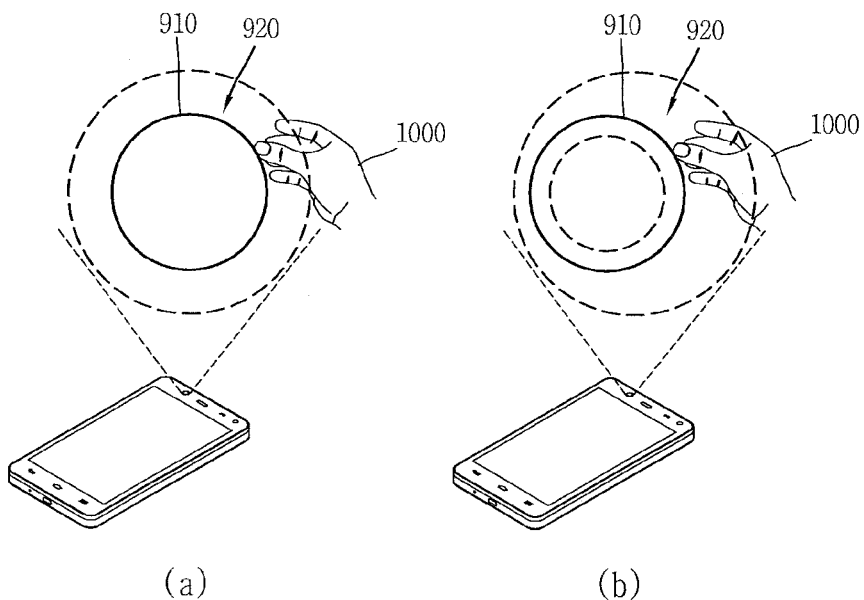
Figure 9F:
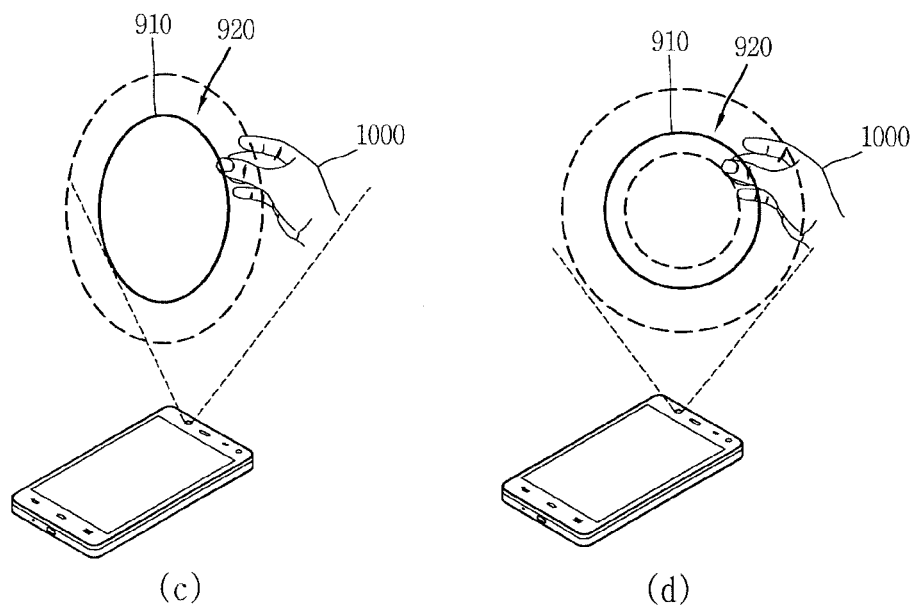

For instance, if a user's gesture is to push or pull a hologram object as shown in FIG. 9F(a) or 9F(b), the controller 180 may output a proper feedback signal according to a characteristic of an object corresponding to the hologram object.

For instance, based on the same gesture to push or pull a hologram object, the controller may output a different feedback signal, according to a weight of an object corresponding to the hologram object, or a surface texture.

For instance, when a weight of an object corresponding to a hologram object is heavy, a feedback signal of a large intensity may be output. With such a configuration, a user may feel that he or she actually pushes or pulls the object.

The controller 180 of the mobile terminal according to the present invention may output a feedback signal in response to a human body's gesture with respect to a hologram object. Further, the controller 180 may control the hologram output unit such that at least one of an output position and a shape of the hologram object is changed.

That is, as shown in FIGS. 9F(a) and 9F(b), the controller 180 may move the hologram object in a preset output space, in response to a gesture of the human body. Also, if an object corresponding to a hologram object is not pushable, the controller 180 may inform a user that the hologram object is not pushable, by changing a shape of the hologram object. For instance, the hologram object may have a distorted shape.

As shown in FIG. 9F(c), even if an object corresponding to the hologram object is moveable, if the hologram object is positioned at a boundary region of a preset space (e.g., outputtable range), the controller 180 may change a shape of the hologram object, without moving the hologram object in response to a gesture of the human body. Alternatively, even if the hologram object is not positioned at a boundary region of a preset space, if there is an external object (e.g., wall) near the hologram object, the controller 180 may not move the hologram object even if a user's gesture to push the hologram object is sensed. The external object may be sensed by a 3D camera, a proximity sensor, etc.

If an object corresponding to the hologram object is not transformable (e.g., tree), even if the hologram object is not pushable any longer, the controller 180 may not change a shape of the hologram object. In this case, the controller 180 may continuously output a signal having at least one of a predetermined intensity, frequency and waveform.

If the hologram object is moved or is transformed by a user's gesture, the controller may output a feedback signal related to the movement or the transformation of the hologram object, to a user. In this case, the feedback signal may be changed according to a characteristic of an object. For instance, the controller may output signals having different intensities when objects corresponding to a hologram object are a balloon and a tree.

If the hologram object is moved, the hologram object may become distant from a user's body. Accordingly, the controller 180 may additionally provide a feedback signal. That is, the controller 180 provides a feedback signal based on a distance between a hologram object and a user. Explanations about that have been aforementioned with reference to FIGS. 9A and 9B, and thus detailed explanations thereof will be omitted.

If an object corresponding to the hologram object is an object through which a user is to pass, the controller 180 may provide a visual effect that a user's body seems to have passed through the hologram object, as shown in FIG. 9F(d). In this case, the controller 180 may output a proper feedback signal such that the user feels as if he or she has entered the object corresponding to the hologram object. For instance, the object may be cheese, and the feedback signal may be a laser or a sound wave having a sine waveform.

Figure 9G:
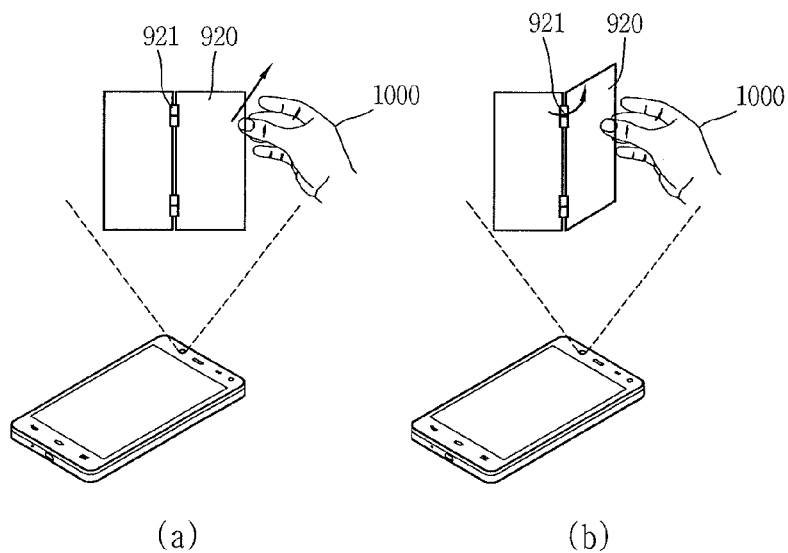

In case of moving a hologram object, the controller 180 may move an entire part of the hologram object, or may move part of the hologram object based on a reference axis, a reference point, a reference line or a reference surface. For instance, as shown in FIG. 9G(a), if an object corresponding to a hologram object has a reference axis (a reference line or a reference surface) (e.g., a rotation point, a rotation surface, a joint point or a joint surface), the controller 180 may move only a region 920 of the hologram object based on the reference axis, as shown in FIG. 9B(b). The object may be a rotatable door, a user's body having joints, etc.

As aforementioned, in the mobile terminal according to the present invention, a different feedback signal is provided based on a characteristic of an object corresponding to a hologram object, and based on a relative position between the hologram object and a user. As a result, a user may be provided with a feedback in a more realistic manner.

In the present invention, information on a region where a feedback signal can be output may be output by using at least one of visible, tactile and audible methods. This will be explained in more detail with reference to the attached drawings.

Figure 11:
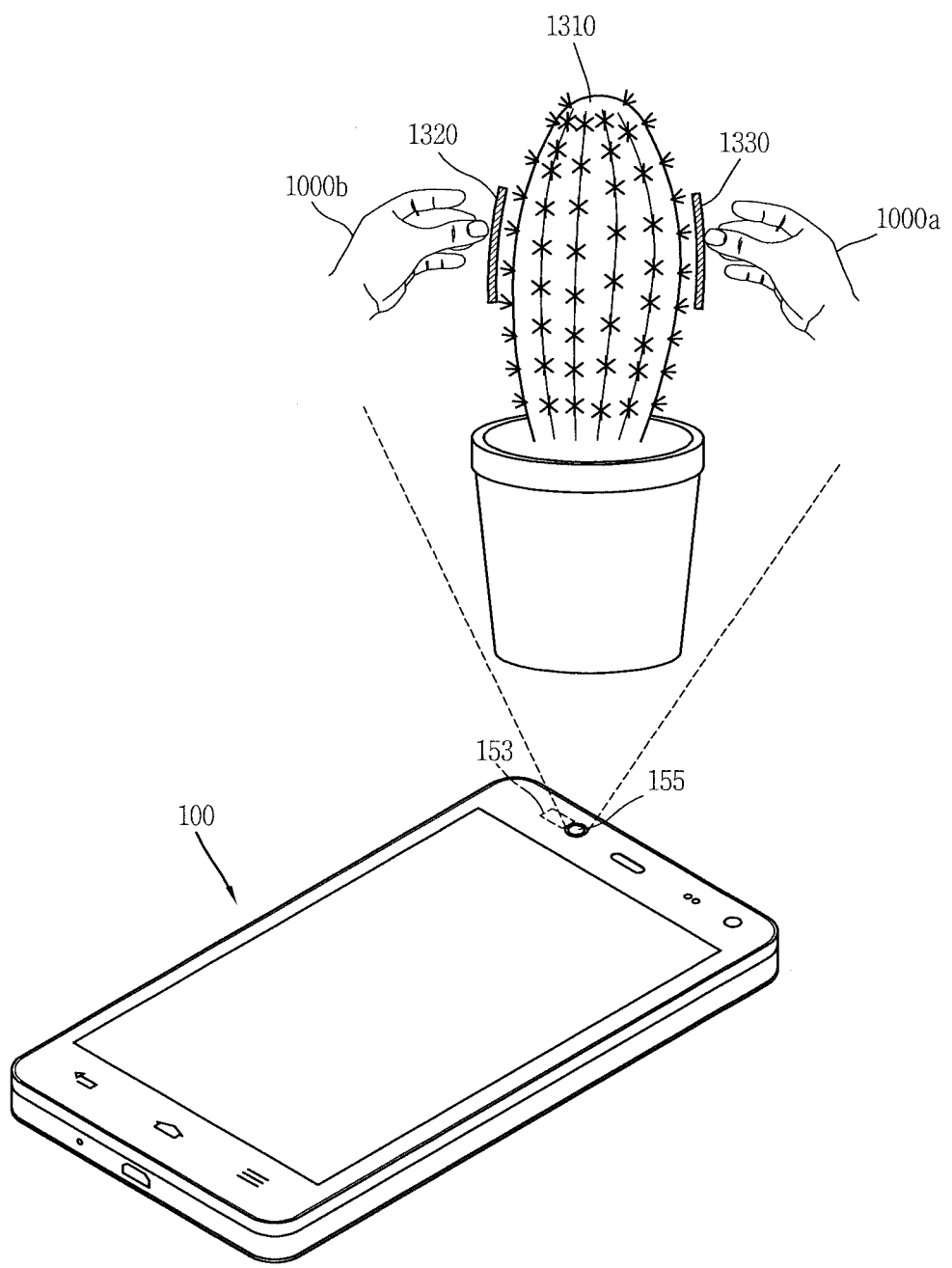
FIG. 11 is a conceptual view illustrating a method for informing a region where a feedback signal can be output, in a mobile terminal according to the present invention.

FIG. 11 is a conceptual view illustrating a method for informing a region where a feedback signal can be output, in the mobile terminal according to the present invention.

In the mobile terminal according to the present invention, when a user approaches a hologram object, guide information indicating an output region of a feedback signal may be output. In this case, the guide information may be implemented as visible information, tactile information or audible information.

The controller 180 may output a specific graphic object to the peripheral region of the hologram object (or the second region, refer to 920 of FIG. 9A). That is, the controller 180 may inform a user that a feedback signal is outputtable when the user enters a corresponding region, by outputting such a graphic object. The controller 180 may output guide information or notification information indicating that a feedback signal can be output, when a user's body is positioned at the peripheral region of the hologram object.

Further, the controller 180 may control the hologram output unit 155 to output the notification information, to a region where the feedback signal can be transferred, the region corresponding to a position of the human body, among the peripheral region of the hologram object. In this case, the controller 180 may output the notification information to parts 1320, 1330 corresponding to a region where the human body is positioned, not an entire part of the peripheral region. In this case, the notification information may be output even when a user is positioned near a region where a feedback signal can be output. With such a configuration, a user may feel that he or she is approaching the hologram object in a more realistic manner.

Figure 12A:
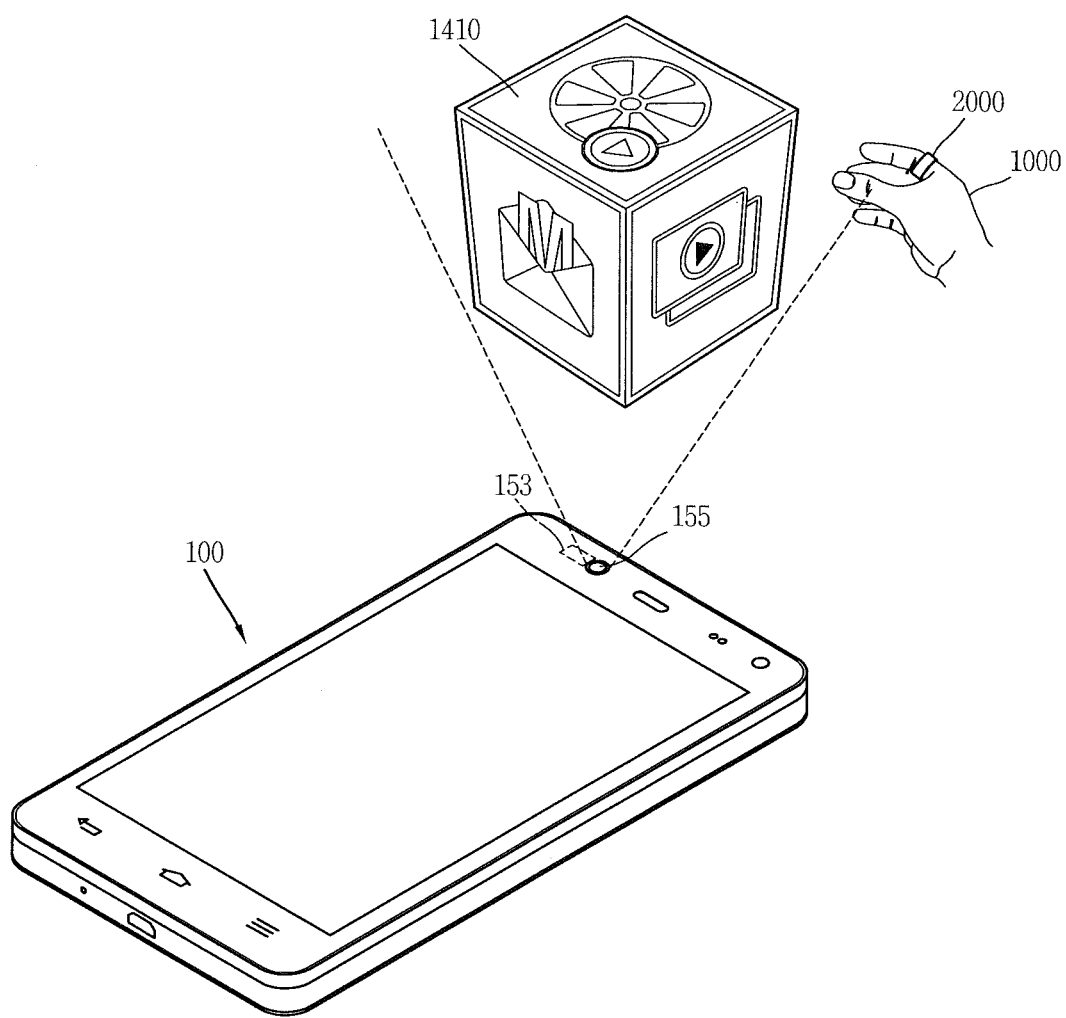
FIGS. 12A and 12B are conceptual views illustrating another embodiment to output a feedback signal.
Figure 12B:
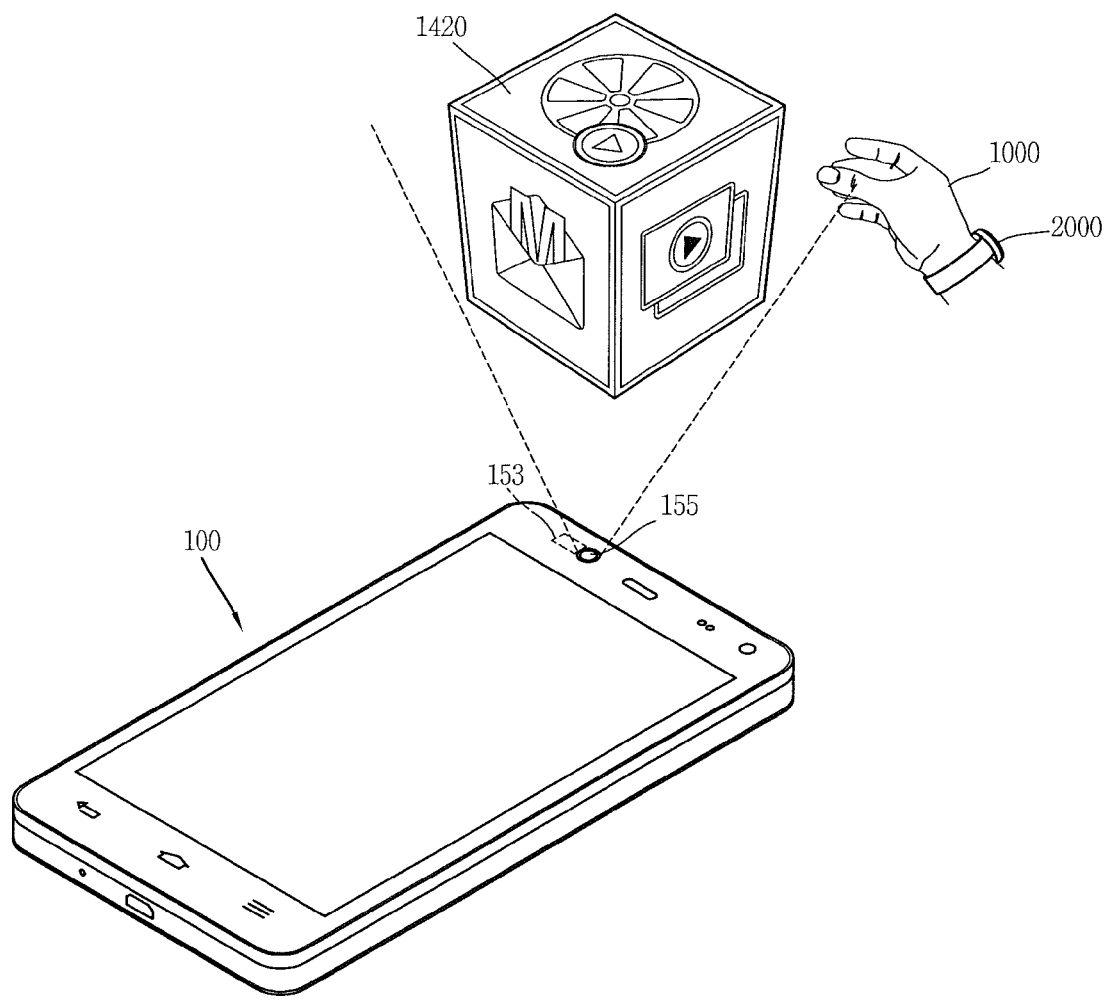

FIGS. 12A and 12B are conceptual views illustrating another embodiment to output a feedback signal.

In the above embodiment, a feedback signal is transmitted through the output unit of the mobile terminal. However, in the mobile terminal according to the present invention, a feedback signal may be transmitted to a user through an external device which communicates with the wireless communication unit 110. For instance, the controller 180 may transmit a feedback signal to a user through data communication with a ring-type external device shown in FIG. 12A, or a watch-type external device shown in FIG. 12B. The ring-type or watch-type external device may include a haptic module for outputting a feedback signal.

The ring-type or watch-type external terminal may transmit a feedback signal to a body of a user who is approaching or contacting a hologram object. In this case, information on coordinates where the feedback signal is transmitted, may be received from the mobile terminal. Since the ring-type or watch-type external terminal is always arranged close to a body of a user who is approaching or contacting a hologram object, the user may be provided with a feedback in a more realistic manner.

The ring-type or watch-type external terminal may be further provided with a pulse sensor or a photo-plethysmography (PPG) sensor. The PPG sensor means a sensor for sensing bio information indicating a blood flow rate based on an amount and a change of incident light, and indicating pulsation components generated by heartbeats. The PPG sensor is configured to measure a blood flow rate by irradiating light of a specific wavelength to a human body by using a light emitting unit provided thereat, and by receiving the irradiated light by using a light receiving unit provided thereat as the irradiated light is reflected after passing through the human body.

When a feedback signal is transmitted to a user, the ring-type or watch-type external terminal may sense a response of the user to the feedback signal, by sensing a blood flow rate of the user through a PPG sensor.

In a case where a feedback signal is transmitted to a user, if a blood flow rate of the user sensed by a PPG sensor is different from that before the feedback signal is transmitted to the user (i.e., if a blood flow rate has a different pattern or is drastically changed), the ring-type or watch-type external terminal may determine that the user has received the feedback signal.

That is, if a user's blood flow rate (or pulsation component) sensed by a PPG sensor has a drastic change, the ring-type or watch-type external terminal may determine that the user was under stress. Further, the ring-type or watch-type external terminal may determine that the stress has resulted from a tactile feedback signal applied to the user. As a result, the ring-type or watch-type external terminal may determine that the user has received a feedback signal.

Sensing a user's bio information with respect to a feedback signal, by the ring-type or watch-type external terminal through the PPG sensor may be also executed when the feedback signal is transmitted from a mobile terminal rather than the ring-type or watch-type external terminal.

In this case, a time point of sensing by the PPG sensor of the ring-type or watch-type external terminal may be the same or similar as or to a time point when the feedback signal is transmitted from the mobile terminal. Information about the time point may be transmitted from the mobile terminal to the ring-type or watch-type external terminal. The PPG sensor of the ring-type or watch-type external terminal may be controlled by the controller 180 of the mobile terminal.

The sensing information through the PPG sensor may be transmitted to the mobile terminal from the ring-type or watch-type external terminal. Then, the controller 180 of the mobile terminal may control an intensity of a feedback signal based on the received sensing information. That is, if a blood flow rate of a user is drastically changed as a sensing result, it may be determined that the user is under a lot of stress due to a feedback signal. In this case, the controller 180 may output the feedback signal with a lower intensity than in the conventional case.

As aforementioned, the mobile terminal according to the present invention may have the following advantages.

Firstly, a feedback signal is transmitted with a separate configuration from the mobile terminal. That is, a user may be provided with a feedback in a more realistic manner according to various modifications. With such a configuration, a feedback signal may be transmitted to a body of a user approaching a hologram object, by using the output unit, especially, the haptic module. Thus, the user may feel that he or she is actually touching a hologram object output to an arbitrary space.

Secondly, a different feedback signal may be transmitted to a body of a user, according to a characteristic of an object corresponding to a hologram object. For instance, the user may be provided with different feedback signals when objects corresponding to a hologram object are cotton candy and wood.

Thirdly, a characteristic of an object corresponding to a hologram object may be represented as an amplitude, an intensity, a frequency, a waveform, etc. of a feedback signal are variously changed. Thus, a user may feel that he or she is actually touching the object corresponding to the hologram object.

Fourthly, since modeling of a hologram object is differently executed according to a type of an object corresponding to a hologram object, a processing speed may be enhanced.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal, comprising:
    a body with a front surface, a side surface and a rear surface;
    a hologram output unit that is provided on one of the front surface, the side surface, and the rear surface;
    a feedback output unit that is provided on a same surface on which the hologram output unit is provided;
    an image sensor; and
    a controller configured to:
        control the hologram output unit to output a hologram object to an output space outside the mobile terminal;
        detect, based on data received from the image sensor, a portion of a human body located within the output space of the hologram object;
        determine a relative position between the hologram object output by the hologram output unit and the portion of the human body;
        detect that the portion of the human body approaches the hologram object based on the relative position between the hologram object and the portion of the human body; and
        control the feedback output unit to transmit a feedback signal towards the portion of the human body that is detected to approach the hologram object.

2. The mobile terminal of claim 1, wherein the feedback output unit comprises at least one of a laser output module or a sound wave output module, and
    wherein the feedback signal comprises at least one of a laser output from the laser output module or a sound wave output from the sound wave output module.

3. The mobile terminal of claim 2, wherein the feedback signal is one of a plurality of different feedback signals, and
    wherein the plurality of feedback signals are different from each other in at least one of an intensity, an amplitude, a frequency, or a waveform of the laser or the sound wave.

4. The mobile terminal of claim 1, wherein the controller is configured to:
    determine that the detection of the portion of the human body approaching the hologram object occurs in a deactivated state of the feedback output unit; and
    convert the deactivated state of the feedback output unit into an activated state to output the feedback signal from the feedback output unit.

5. The mobile terminal of claim 1, wherein the output space of the hologram object comprises a first region where the hologram object is positioned and a second region adjacent to the first region, and
    wherein the controller is configured to:
    determine whether the portion of the human body is positioned in the first region or the second region; and
    control the feedback output unit to output the feedback signal according to the determination of whether the portion of the human body is positioned in the first region or the second region.

6. The mobile terminal of claim 5, wherein the controller is configured to control the feedback output unit to output a first feedback signal or a second feedback signal based on whether the portion of the human body is positioned in the first region or the second region, respectively.

7. The mobile terminal of claim 5, wherein the controller is configured to:
    compare coordinate information of the portion of the human body with coordinate information of the first region where the hologram object is positioned and coordinate information of the second region adjacent to the first region;
    determine a relative position between the hologram object and the portion of the human body based on the comparison of coordinate information of the portion of the human body with coordinate information of the first region where the hologram object is positioned and coordinate information of the second region adjacent to the first region; and
    determine that the portion of the human body is located in one of the first region or the second region based on the determination of the relative position between the hologram object and the portion of the human body.

8. The mobile terminal of claim 7, wherein the controller is configured to:

determine a model of the hologram object and a model of the portion of the human body; and determine, based on the model of the hologram object and the model of the portion of the human body, the coordinate information of the first region where the hologram object is positioned, the coordinate information of the second region adjacent to the first region, and the coordinate information of the portion of the human body.

9. The mobile terminal of claim 8, wherein the controller is configured to determine the model of the portion of the human body by:

determining an image of the portion of the human body acquired by the image sensor;

determining an image object corresponding to the portion of the human body from the image acquired by the image sensor; and determining the model of the portion of the human body based on the image object corresponding to the portion of the human body that was determined from the image acquired by the image sensor.

10. The mobile terminal of claim 8, wherein the controller is configured to determine the model of the hologram object by:

determining a characteristic of an object corresponding to the hologram object;

selecting, from among a plurality of modelling methods, a modelling method based on the determined characteristic of the object corresponding to the hologram object; and determining the model of the hologram object based on executing the modelling method selected from among the plurality of modelling methods.

11. The mobile terminal of claim 1, wherein the controller is configured to control the feedback output unit by:

determining a characteristic of an object corresponding to the hologram object; and controlling the feedback output unit to transmit the feedback signal based on the determined characteristic of the object corresponding to the hologram object, wherein determining the characteristic of the object corresponding to the hologram object comprises determining at least one of a type, a weight, a size, an intensity, a shape, or a surface of the object corresponding to the hologram object.

12. The mobile terminal of claim 11, wherein the controller is configured to control the feedback output unit to transmit the feedback signal according to the determined characteristic of the object corresponding to the hologram object by:

controlling at least one of an intensity, an amplitude, a frequency, or a waveform of the feedback signal.

13. The mobile terminal of claim 1, wherein the controller is configured to:

determine that the portion of the human body is positioned in a peripheral region that is within a predetermined distance of the hologram object; and output, based on the determination that the portion of the human body is positioned in the peripheral region of the hologram object, notification information indicating that the feedback signal is capable of being output.

14. The mobile terminal of claim 13, wherein the notification information comprises video information, and wherein the controller is configured to output the notification information indicating that the feedback signal is capable of being output by:

determining a region, within the peripheral region of the hologram object, that corresponds to a position of the portion of the human body and where the feedback signal is capable of being transmitted; and controlling the hologram output unit to output the notification information to the determined region within the peripheral region of the hologram object that corresponds to the position of the portion of the human body and where the feedback signal is capable of being transmitted.

15. The mobile terminal of claim 1, wherein the controller is configured to control the feedback output unit to transmit the feedback signal towards the portion of the human body by:

determining a speed at which the portion of the human body approaches the hologram object;

outputting a first feedback signal based on a determination that the portion of the human body approaches the hologram object at a first speed, and outputting a second feedback signal different from the first feedback signal based on a determination that the portion the human body approaches the hologram object at a second speed different from the first speed.

16. The mobile terminal of claim 1, wherein the image sensor is configured to sense a gesture of the portion of the human body that approaches the hologram object, and wherein the controller is configured to control the hologram output unit to change at least one of an output position or a shape of the hologram object, in response to the sensed gesture of the portion of the human body.

17. The mobile terminal of claim 16, wherein the controller is configured to control the hologram output unit to change the output position of the hologram object within the output space in response to a gesture of the human body, and wherein the controller is further configured to:

determine whether the hologram object is positioned at a boundary region of the output space; and control the hologram output unit, based on a determination that the hologram object is positioned at the boundary region of the output space, to change the shape of the hologram object in response to a gesture of the human body.

18. A method for controlling a mobile terminal, comprising:

outputting, by a hologram output unit, a hologram object to an output space outside the mobile terminal;

sensing, via a sensor, a portion of a human body located within the output space of the hologram object;

determining a relative position between the hologram object and the portion of the human body;

detecting, based on the relative position between the hologram object and the portion of the human body, that the portion of the human body approaches the hologram object; and controlling, based on the detection that the portion of the human body approaches the hologram object, a feedback output unit such that a feedback signal is transmitted towards the portion of the human body that approaches the hologram object, wherein the feedback output unit and the hologram output unit are provided on a same surface of a body of the mobile terminal.

19. The method of claim 18, wherein the output space of the hologram object comprises a first region where the hologram object is positioned and a second region adjacent to the first region, and wherein the controller is configured to:

determine whether the portion of the human body is positioned in the first region or the second region; and control the feedback output unit to output the feedback signal according to determination of whether the human body is positioned in the first region or the second region.

20. The method of claim 18, wherein the feedback signal comprises at least one of a laser or a sound wave, and wherein the controller is configured to:

determine a characteristic of an object corresponding to the hologram object; and control the feedback output unit to output at least one of an intensity, an amplitude, a frequency, or a waveform of the feedback signal based on the determined characteristic of the object corresponding to the hologram object.

* * * * *